United States Patent
Koike et al.

(10) Patent No.: US 9,197,715 B2
(45) Date of Patent: Nov. 24, 2015

(54) INFORMATION PROCESSING APPARATUS AND DATA CONTROL METHOD

(71) Applicant: FUJITSU LIMITED, Kawasaki (JP)

(72) Inventors: Yasuo Koike, Numazu (JP); Daisuke Shimabayashi, Numazu (JP); Shinji Yamabiraki, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 357 days.

(21) Appl. No.: 13/713,642

(22) Filed: Dec. 13, 2012

(65) Prior Publication Data

US 2013/0159525 A1    Jun. 20, 2013

(30) Foreign Application Priority Data

Dec. 20, 2011   (JP) ................................. 2011-278804

(51) Int. Cl.
*G06F 15/173*     (2006.01)
*H04L 29/08*     (2006.01)

(52) U.S. Cl.
CPC ...................................... *H04L 67/32* (2013.01)

(58) Field of Classification Search
None
See application file for complete search history.

(56) References Cited

U.S. PATENT DOCUMENTS

| | | | |
|---|---|---|---|
| 5,924,096 A * | 7/1999 | Draper et al. | |
| 2005/0219564 A1* | 10/2005 | Arai | 358/1.9 |
| 2005/0220112 A1* | 10/2005 | Williams et al. | 370/394 |
| 2007/0282915 A1 | 12/2007 | Vosshall et al. | |
| 2009/0296580 A1* | 12/2009 | Williams et al. | 370/235 |

FOREIGN PATENT DOCUMENTS

| | | |
|---|---|---|
| JP | 11-17769 | 1/1999 |
| JP | 2010-501942 | 1/2010 |

* cited by examiner

*Primary Examiner* — Brian P Whipple
(74) *Attorney, Agent, or Firm* — Staas & Halsey LLP

(57) ABSTRACT

An information processing apparatus includes a memory; and a processor to execute a process including: adding an identifier based on a reception order to an access request indicating a transmission request or a reception request of a block of data received from a client terminal; retrieving, from among information processing apparatus which is included in a distribution-type network which distributes transmitting and receiving processing of a data, an information of the information processing apparatus which processes an access request added with the identifier which is scheduled to be added; storing, in the memory, the information of the information processing apparatus in association with the identifier which is scheduled to be added; and replying the information, which is stored in association with the identifier in the memory when the identifier is added to an access request, to the client terminal.

11 Claims, 28 Drawing Sheets

| MESSAGE IDENTIFIER | DATA |
|---|---|
| QUEUE A#0001 | DATA A1 |
| QUEUE B#0010 | DATA B1 |
| QUEUE A#0002 | DATA A2 |
| ⋮ | ⋮ |

FIG. 5

| QUEUE NAME | ATTRIBUTE | COUNTER VALUE |
|---|---|---|
| QUEUE A | 1 | 100 |
| QUEUE A | 2 | 90 |
| QUEUE B | 1 | 5 |
| QUEUE B | 2 | 5 |
| ⋮ | ⋮ | ⋮ |

FIG. 7

| MESSAGE IDENTIFIER | DATA |
|---|---|
| QUEUE A#0001 | DATA A1 |
| QUEUE B#0010 | DATA B1 |
| QUEUE A#0002 | DATA A2 |
| ⋮ | ⋮ |

FIG. 23
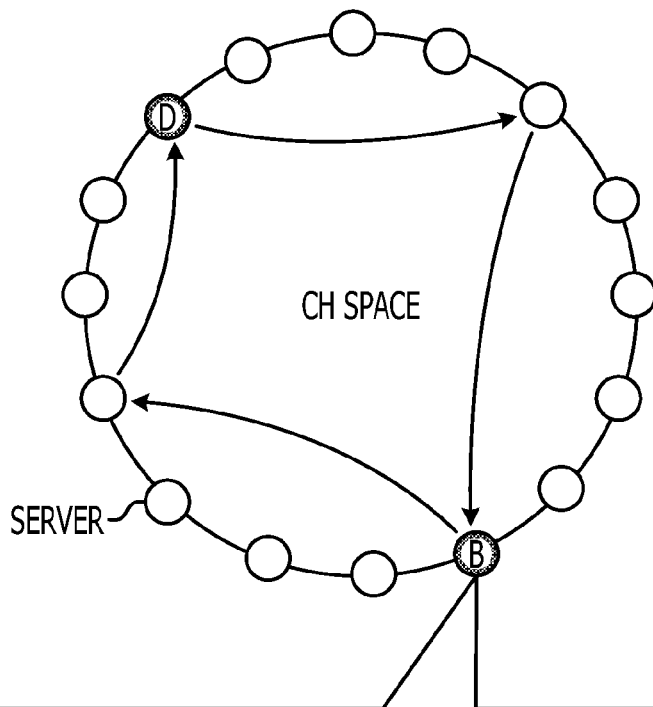
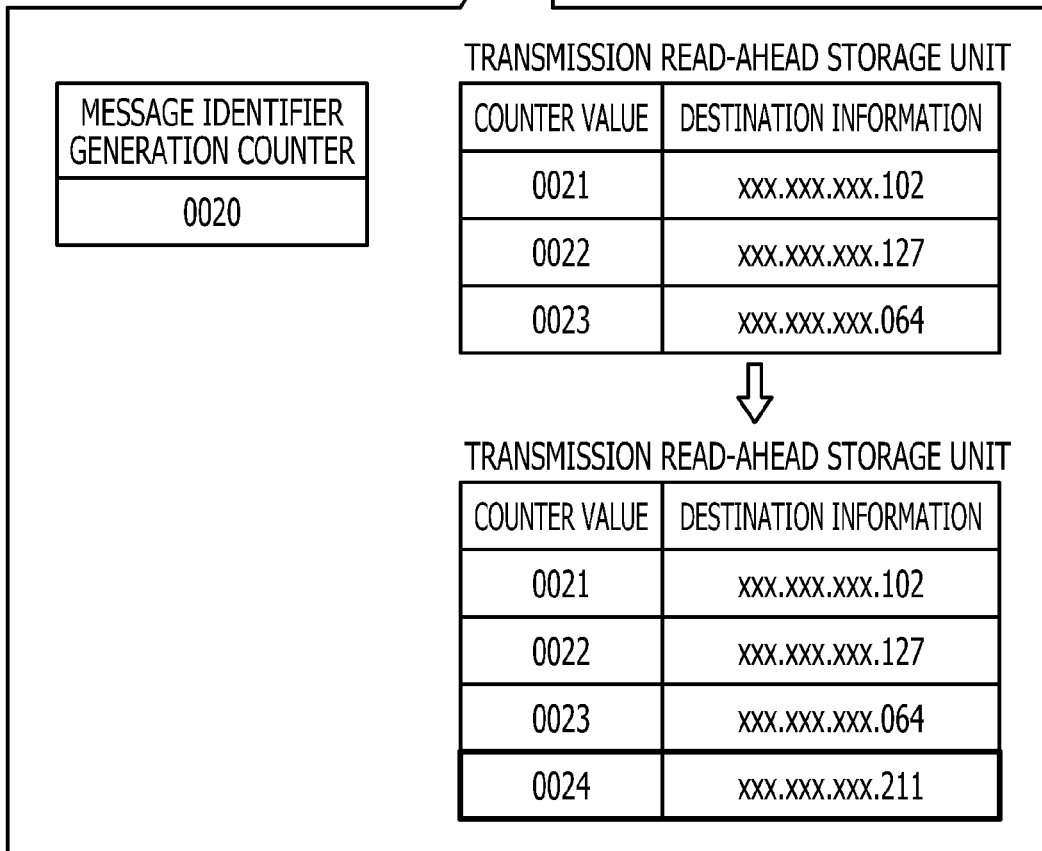

FIG. 24

| COMMUNICATION TYPE | - |
| --- | --- |
| QUEUE NAME HASH VALUE | - |
| TRANSFER SOURCE SERVER IDENTIFIER | - |
| DESTINATION INFORMATION | - |
| MESSAGE IDENTIFIER | - |
| MESSAGE ACTUAL DATA | - |

⇩ PROCESSING START

| COMMUNICATION TYPE | READ-AHEAD (REQUEST) |
| --- | --- |
| QUEUE NAME HASH VALUE | aaaaaaaa |
| TRANSFER SOURCE SERVER IDENTIFIER | SERVER B |
| DESTINATION INFORMATION | - |
| MESSAGE IDENTIFIER | - |
| MESSAGE ACTUAL DATA | - |

⇩ TRANSFER MESSAGE TO SERVER THAT ACTUALLY STORES DATA

| COMMUNICATION TYPE | READ-AHEAD (REPLY) |
| --- | --- |
| QUEUE NAME HASH VALUE | aaaaaaaa |
| TRANSFER SOURCE SERVER IDENTIFIER | SERVER B |
| DESTINATION INFORMATION | aaa.aaa.aaa.211 |
| MESSAGE IDENTIFIER | - |
| MESSAGE ACTUAL DATA | - |

⇩ REPLY MESSAGE TO QUEUE DICTIONARY SERVER

END

FIG. 27
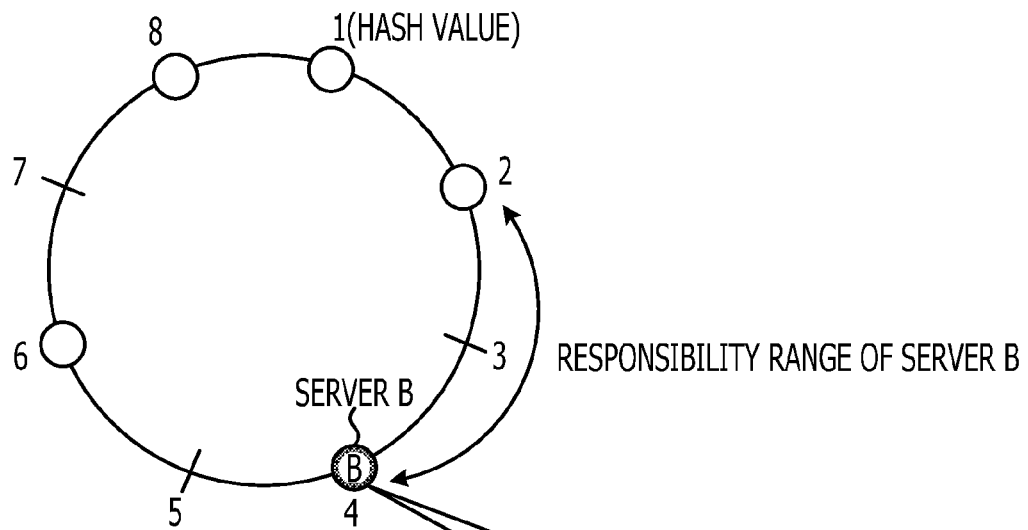
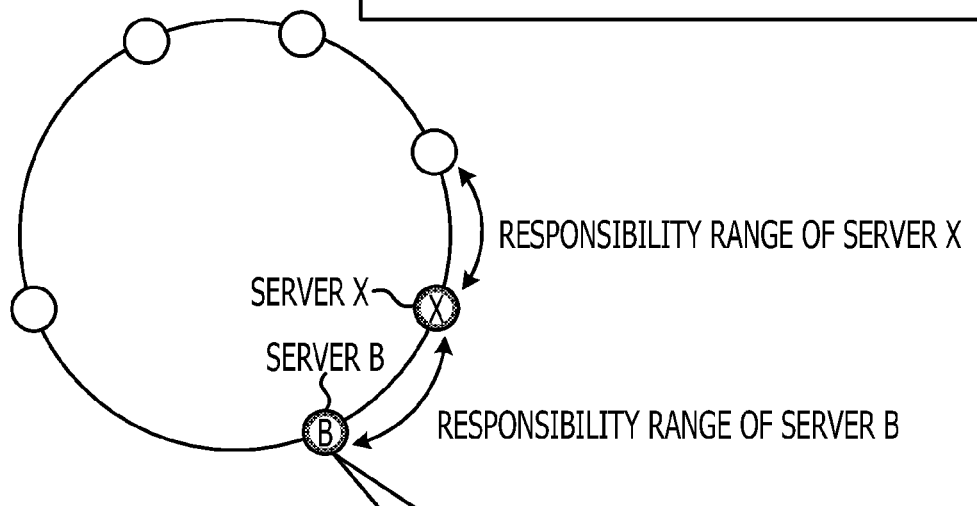
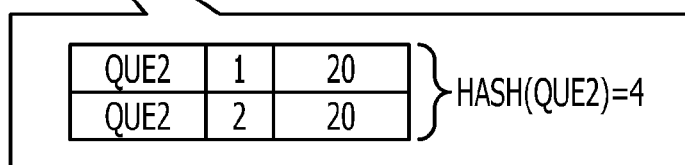

INFORMATION PROCESSING APPARATUS AND DATA CONTROL METHOD

CROSS-REFERENCE TO RELATED APPLICATIONS

This application is based upon and claims the benefit of priority of the prior Japanese Patent Application No. 2011-278804 filed on Dec. 20, 2011, the entire contents of which are incorporated herein by reference.

FIELD

The embodiments discussed herein are related to an information processing apparatus and a data control method.

BACKGROUND

Conventionally, a message queue that asynchronously aligns different processes has been known as a technique for transmitting a message from a transmitter of the message to a receiver of the message. When the message queue is used, allocation design of the message queue is performed so that a server that accesses the message queue and an amount of the message queue are previously determined.

In general, an application for transmitting a message transmits a message without recognizing the state of the message reception side. Accordingly, when the reception side may not receive the message, a storage area of the message is insufficient. Thus, the message transmission may not be performed. That is, overcapacity may occur due to stagnant. To avoid the overcapacity, there is a known technique for dynamically expanding a physical capacity of the message queue while making a plurality of servers look like a single virtual message queue.

Since the message queue handles a large capacity of data in most cases, the performance may deteriorate due to the I/O load with respect to the storage area of the message. On the contrary, by dividing the storage area of the message into a plurality of areas and determining the storage area by Round Robin method, a technique for distributing the I/O load is used.

Distributed Hash Table (DHT) for distributing data into a plurality of servers has been known as a technique for performing dynamic expansion and load distribution of the storage area of the data. The DHT is a distributed data structure or an algorithm for assigning a key to the data and determining a server that process or store the data according to the assigned key. Consistent Hash (CH) has been known as mounting of the DHT.

More specifically, the DHT determines an assigned area of a fixed length bit space by using a hash function for each server. The DHT calculates the key of the data to be stored by using the hash function and stores the key in the assigned area. In this manner, the DHT configures a Peer to Peer (P2P) overlay network. The CH is used as a distribution storage having expandability as an architecture that may correspond to variations of a system configuration.

To determine a server in charge based on a hash value calculated by using destination information such as internet protocol (IP) address, the DHT manages the IP address of each of the servers forming the CH space. There are two types of management method. One is a method for central management in a special server that is accessible from the servers. The other one is a method for managing in each of the servers. As for a large-scale distributed system of recent years, the method for managing in each of the servers is used in most cases from the perspective of usability.

As for the method for managing in each of the servers, the destination information to be managed increases as the number of servers increases. A large amount of communication traffic for performing life-and-death monitoring of each of the servers or performing synchronizing processing of the destination information may occur. As a method for solving the above-described problem, there is a known routing algorithm for reducing the destination information that is held in a single server and decreasing the number of servers (hereinafter referred to as the number of hops) through which the information reaches a target server. An algorithm such as Chord and Pasty forming a logic space on a closed number line or an algorithm such as CAN forming a logic space by using N-dimensional torus has been known as an example of the routing algorithm. When the Chord is used, the target server is reached in the number of hops of O ($\log_2 N$) regardless of the number of servers (N). As Related art, for example, Japanese Unexamined Patent Publication (Translation of PCT application) No. 2010-501942, and Japanese Laid-open Patent Publication No. 11-017769 are disclosed.

However, the conventional technique has a problem that the data processing speed is insufficient.

For example, like a Web front system for online stock trading, in a system with a competitive advantage that is improved when latency thereof is decreased by reducing a single communication of a few hundred microseconds, the stability of the speed of the processing of the data or the speed desired for the data processing in the Chord method is insufficient. The same can be said of a system in which processing such as streaming processing corresponds to a case where the communication speed is latest.

More specifically, as for the Chord, the communication has tow hops or more in more than 50 percent of the time regardless of the number of servers. If the number of server is 100, the communication has five hops at most, and one millimeter or more of difference in communication performance may be generated. That is, in the processing over a plurality of servers, useless communication in a lower layer may occur if the overhead is high and a topology of an overlay is made independently of the topology in the lower layer. In this manner, even when the algorithm such as Chord is used, the sufficient processing speed may not be achieved depending on a system.

SUMMARY

According to an aspect of the invention, an information processing apparatus includes a memory; and a processor to execute a process including: adding an identifier based on a reception order to an access request indicating a transmission request or a reception request of a block of data received from a client terminal; retrieving, from among information processing apparatus which is included in a distribution-type network which distributes transmitting and receiving processing of a data, an information of the information processing apparatus which processes an access request added with the identifier which is scheduled to be added; storing, in the memory, the information of the information processing apparatus in association with the identifier which is scheduled to be added; and replying the information, which is stored in association with the identifier in the memory when the identifier is added to an access request, to the client terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of information that is stored in a queue dictionary data storage unit;

FIG. 7 is a diagram illustrating an example of information that is stored in a message storage unit;

FIG. 23 is a diagram illustrating a whole flow of processing of a transmission read-ahead storage unit;

FIG. 24 is a diagram illustrating the transition of the message in the processing of the transmission read-ahead storage unit;

FIG. 27 is a diagram illustrating the behavior of the queue dictionary data in a case where a server X comes into the CH space.

DESCRIPTION OF EMBODIMENTS

With reference to the diagrams, embodiments of an information processing apparatus, a data control method, and a data control program will be described in detail below. The present application is not limited to the embodiments.

Figure 1:
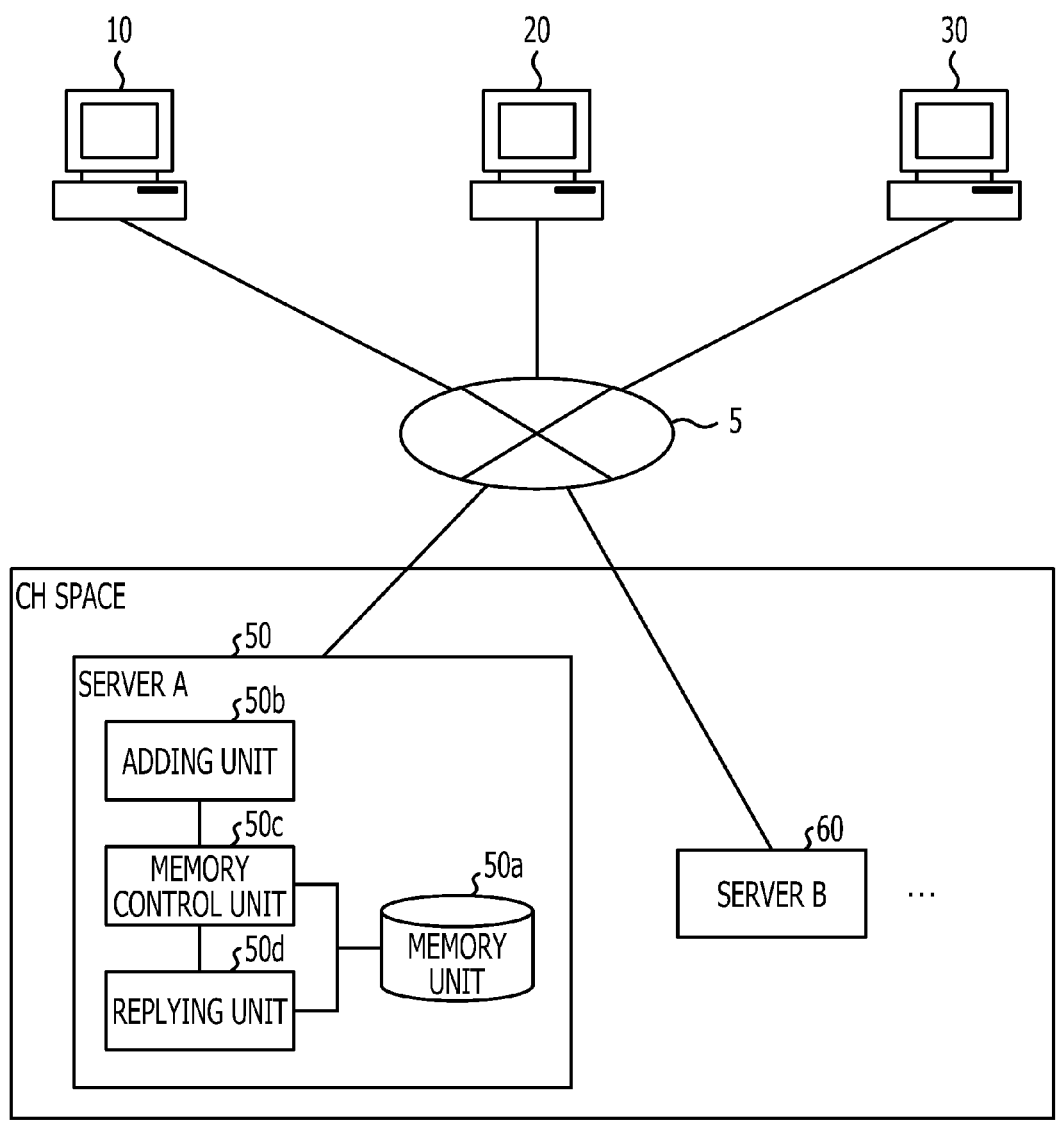
FIG. 1 is a diagram illustrating an example of an entire configuration of a system according to a first embodiment.

FIG. 1 is a diagram illustrating an example of an entire configuration of a system according to a first embodiment. As illustrated in FIG. 1, this system has a client terminal 10, a client terminal 20, a client terminal 30, a server A50, and a server B60 that are coupled to be communicable to each other through a network 5. The system illustrated in FIG. 1 forms a distribution hash table using Chord. That is, the system performs asynchronous cooperation among the message queue formed by the servers, a client terminal that transmits data to the message queue, and a client terminal that reads out and receives the data from the message queue.

The above-described number of devices is an example. The present application is not limited to the example. The client terminals and the servers may operate on a single physical machine. That is, the system illustrated in FIG. 1 is not a physical system that is configured with the physical machine but a logical system that is configured with a virtual machine and the like. The algorithm that realizes the distributed hash table may use another algorithm other than Chord.

Figure 2:
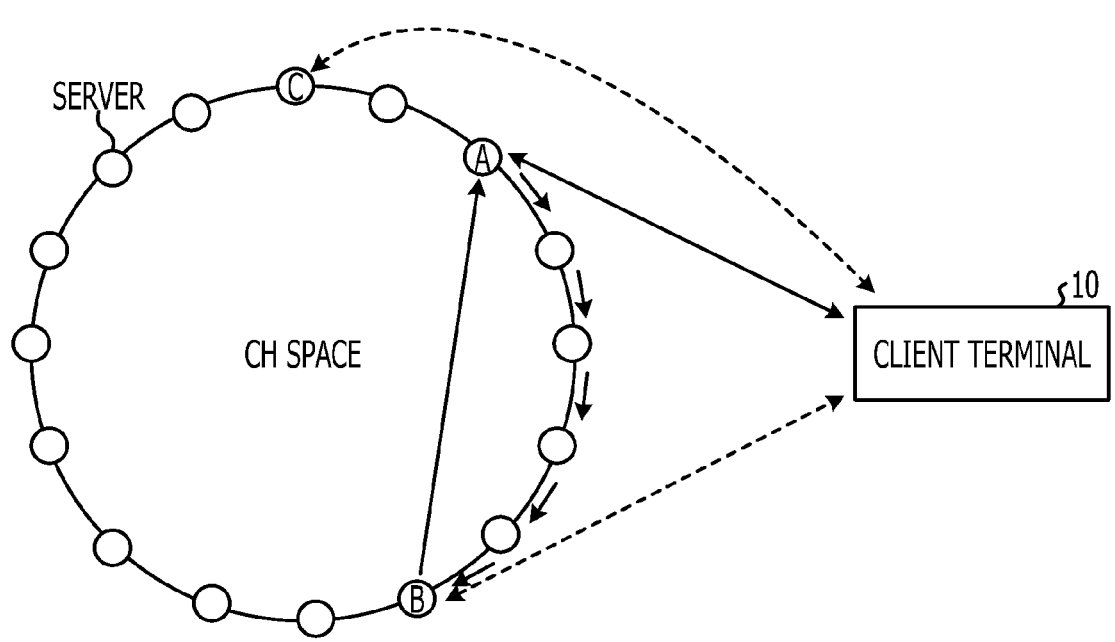
FIG. 2 is a diagram illustrating a CH space of the system according to the first embodiment.

The server A50 and the server B60 form the CH space as a distribution-type network that distributes transmitting and receiving processing of the data between the client terminals. FIG. 2 is a diagram illustrating the CH space of a system according to a first embodiment. The servers illustrated in FIG. 2 are positioned on the CH space according to the hash value of a queue name of a message queue, for example. The CH space is formed by coupling the servers in a link shape based on the position on the CH space. The spaces divided by the hash values are assigned as the spaces in charge to the servers, respectively. Each of the servers holds a routing table that is used to transfer the data. The routing table stores, for example, an Internet Protocol (IP) address of the server positioned clockwise, the IP address of the server positioned in the opposing position in the link shape, and the like. The information stored in the routing table is generally used in Chord or the like.

Here, there is an example of transmission of the data by the client terminal in the CH space illustrated in FIG. 2. The client terminal 10 specifies the queue name of a message queue X and then transmits an open request of the queue to the server A50. The server A50 converts the received queue name into a hash value and then specifies that the server A50 is not in charge. After that, the server A50 adds the IP address of the server A50 to the received request and then transfers the request according to the routing method of Chord. The server that received the request transfers the request to the next server after specifying, by the similar method, that the server is not in charge.

The request that is transferred in the above-described manner is received by the server B60. By using the similar method, the server B60 specifies that the own apparatus is in charge. The server B60 transmits the request that is added with the IP address of the own apparatus when the IP address of the server A50 already added to the request is the destination. The server A50 that receives the transmission request replies the IP address of the server B60 that is added to the received request to the client terminal 10.

The client terminal 10 accesses the IP address of the server B60 received from the server A50 and then establishes a connection with the server B60. In this manner, the message queue that is specified by the client terminal is opened. After that, the client terminal 10 transmits the transmission request of the data designated to a message queue X to the server B60 with which the connection is established.

The server B60 converts the queue name included in the received transmission request into a hash value and then specifies that the own apparatus is in charge. After that, the server B60 converts an identifier that increases or decreases in order of the requests into a hash value and then specifies a server C70 as a storage destination of the data by the above-described method. After receiving the IP address from the server C70, the server B60 transmits the received IP address to the client terminal 10 as the storage destination. The client terminal 10 stores the data in the server C70. In this manner, the client terminal 10 may transmit the data by using a message queue X. To receive the data, the processing that is similar to the above-described data transmitting processing is performed.

As illustrated in FIG. 1, the server A50 that performs the above-described processing includes a memory unit 50a, an adding unit 50b, a memory control unit 50c, and a replying unit 50d. The servers in the CH space have the similar configurations.

The adding unit 50b adds the identifier based on the reception sequence to the address request, which indicates the transmission request or the reception request of the data, received from the client terminal 10. The memory control unit 50c retrieves, from among the servers forming a distribution-type network in which the transmitting and receiving processing of the data is distributed, the server that processes the access request added with the identifier, by the adding unit 50b, that is scheduled to be added. The memory control unit 50c causes the memory unit 50a to store the information that specifies the retrieved server in association with the identifier that is scheduled to be added. When the adding unit 50b adds the identifier to the access request, the replying unit 50d replies the information to be stored in association with the added identifier in the memory unit 50a to the client terminal 10.

In this manner, the server forming the CH space retrieves a storage destination server corresponding to the request that is issued next regardless of the existence of the request from the client terminal, and then previously stores device information of the storage destination server. This may reduce the overhead of internal transfer of the CH that increases as the system size increases. As a result, the data processing speed may be improved.

The configurations of the devices forming the system illustrated in FIG. 1 will be described below. The client terminals have the similar configurations. The client terminal 10 will be described below. The servers have the similar configurations. The server A50 will be described below.

[Configuration of Client Terminal]

Figure 3:
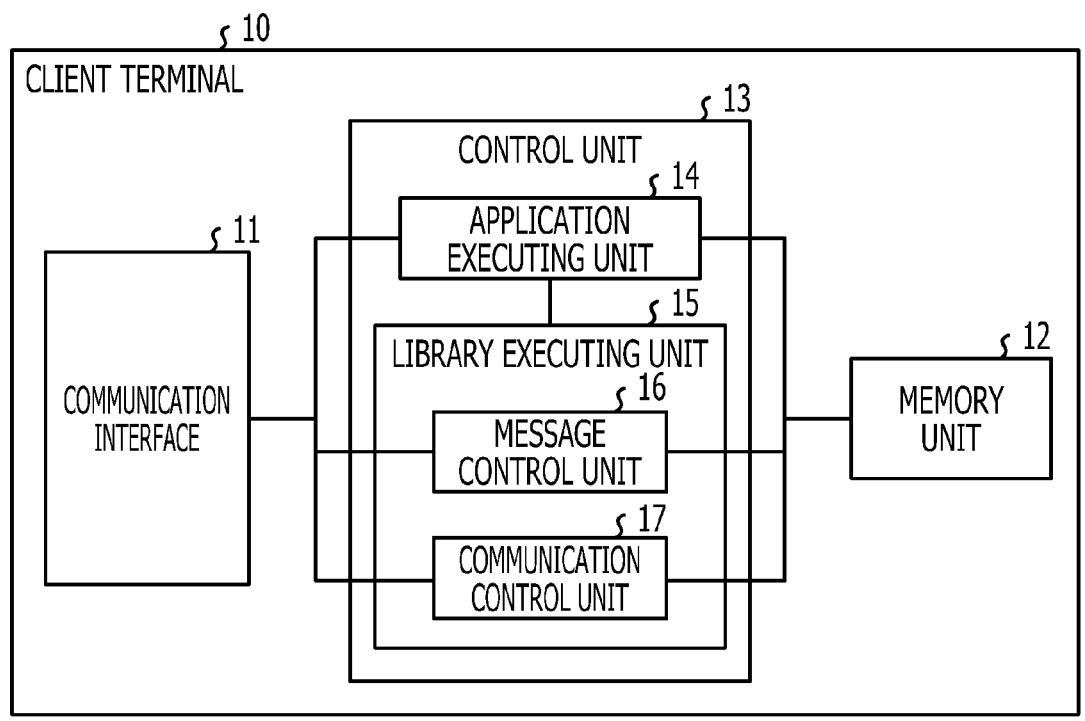
FIG. 3 is a function block diagram illustrating a configuration of a client terminal according to a second embodiment.

FIG. 3 is a function block diagram illustrating a configuration of a client terminal according to a second embodiment. As illustrated in FIG. 3, the client terminal 10 is a computer device that includes a communication interface 11, a memory unit 12, and a control unit 13. The illustrated processing units are an example. The present application is not limited to the example. For example, the client terminal 10 may include a display unit such as a display, an input unit such as a mouse, a medium reading device that reads data from a medium, and the like.

The communication interface 11 is a network interface card or the like that controls the communication of another device. For example, the communication interface 11 requests message queue open of the server A50, transmits the data to the server A50, and receives the data from the server A50. The communication interface 11 receives, from the server A50, the IP address of the server in charge of the message queue and receives the IP address of the server as the storage destination of the data from the server A50.

The memory unit 12 is a storage device such as a semiconductor memory device or a hard disk that stores a program, an application, a library, and data that are executed by the control unit 13. The control unit 13, which is an electronic circuit such as a processor operating an Operating System (OS), controls the entire client terminal 10. The control unit 13 has an application executing unit 14 and a library executing unit 15.

The application executing unit 14 is a processing unit that executes the application stored in the memory unit 12. The application executing unit 14 executes the application and requests data transmission or data reception by the library executing unit 15.

The library executing unit 15 is a processing unit that includes a message control unit 16 and a communication control unit 17 to control the communication with the server. According to an instruction of the application executing unit 14, the message control unit 16 transmits various requests such as open request of message queue or data transmission request to the sever in the CH space.

The message control unit 16 stores, in the memory unit 2, destination information of a queue dictionary of the message queue in which the application declares the coupling. That is, the memory unit 12 stores the information of the opened message queue. For example, the memory unit 12 stores the queue name of the opened message queue in association with the IP address of the server in charge of the message queue. The message control unit 16 controls the data transmission and the data reception according to the destination information of the queue dictionary to transfer the transmission request or the reception request of the data to another server.

The communication control unit 17 is a processing unit which secures a communication source and controls the communication with the server. For example, the communication control unit 17 establishes the connection with the server in charge of the opened message queue. The communication control unit 17 uses the established connection to transmit and receive the data to and from the server. There may be a plurality of clients to correspond to a single message queue.

Figure 4:
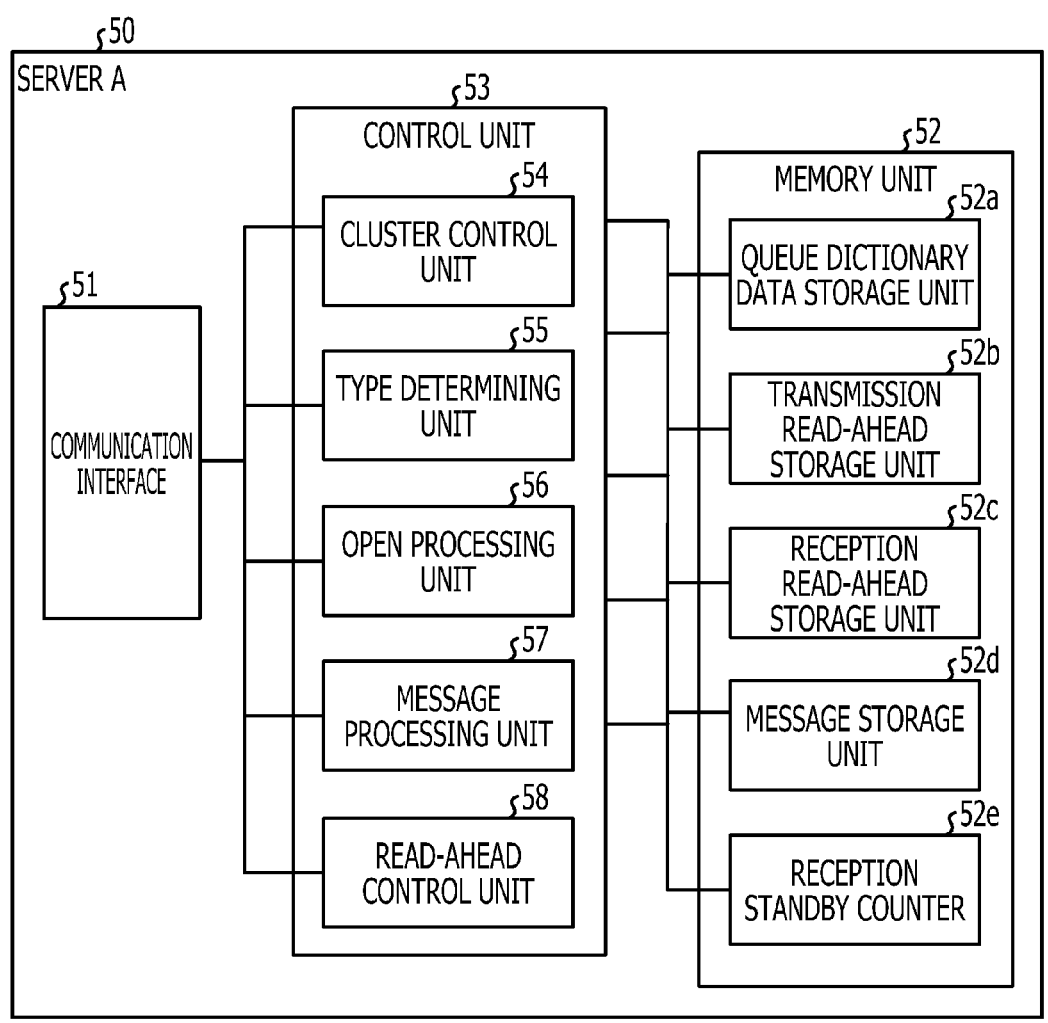
FIG. 4 is a function block diagram illustrating a configuration of a server according to the second embodiment.

FIG. 4 is a function block diagram illustrating a configuration of a server according to the second embodiment. As illustrated in FIG. 4, the server A50 includes a communication interface 51, a memory unit 52, and a control unit 53. The above-described processing units are an example. The present application is not limited to the example. For example, the server 50A may include a display unit such as a display, an input unit such as a mouse, a medium reading device or the like that reads out the data from the medium.

The communication interface 51 is a network interface card or the like that controls the communication with another device. The communication interface 51 establishes a connection with the client terminal that performs the data transmission and the data reception by using the opened message queue. For example, the communication interface 51 receives an open request for requesting the message queue open from another server or client terminal and receives and sends a reply corresponding to the open request to the client terminal. The communication interface 51 receives the transmission request or the reception request of the data from the client terminal and transmits the reply corresponding to the request to the client terminal. The communication interface 51 receives the data of a storage target from the client terminal and transmits the data that is read out from the memory unit 52.

The memory unit 52 is a memory device such as a semiconductor memory element or a hard disk that stores the program or the data to be executed by the control unit 53. The memory unit 52 includes a queue dictionary data storage unit 52a, a transmission read-ahead storage unit 52b, a reception read-ahead storage unit 52c, a message storage unit 52d, and a reception standby counter 52e. The memory unit 52 stores the routing table of the CH space. The routing table to be stored stores the information similar to the routing table that is used in the algorithm such as Chord.

For each message queue, the queue dictionary data storage unit 52a stores a counter that is used to generate an identifier that identifies a message such as the transmission request or the reception request of the data and a counter that is used to manage processed messages. FIG. 5 is a diagram illustrating an example of information that is stored in the queue dictionary data storage unit. As illustrated in FIG. 5, the queue dictionary data storage unit 52a stores the queue names in association with the counter values. The queue dictionary data storage unit 52a has indexes in association with the queue names and the attributes. That is, the queue dictionary data storage unit 52a has a queue value store configuration in which the association of the queue names and the attributes is indicated as a key and the counter value is indicated as a Value.

Here, "queue name" to be stored is an identifier that is assigned to a message queue to identify the message queue. Here, "attribute" indicates an attribute of a counter value. In a case of a message identifier counter that indicates an identifier added to the message, "1" is stored. In a case of a counter for processed message management indicating the identifier added to the processed message, "2" is stored. Here, "counter value" indicates the added latest identifier or the processed latest identifier, and an integral value for controlling First In First Out (FIFO) is stored.

In FIG. 5, regarding the queue A, the identifier added to the transmission request corresponding to the latest data stored in the queue A indicates 100. Further, the identifier added to the reception request corresponding to the latest data read out from the queue A indicates 90. Similarly, regarding the queue B, the identifier added to the transmission request corresponding to the latest data stored in the queue B indicates 5. The identifier that is added to the reception request corresponding to the latest data read out from the queue B indicates 5.

Figure 6:
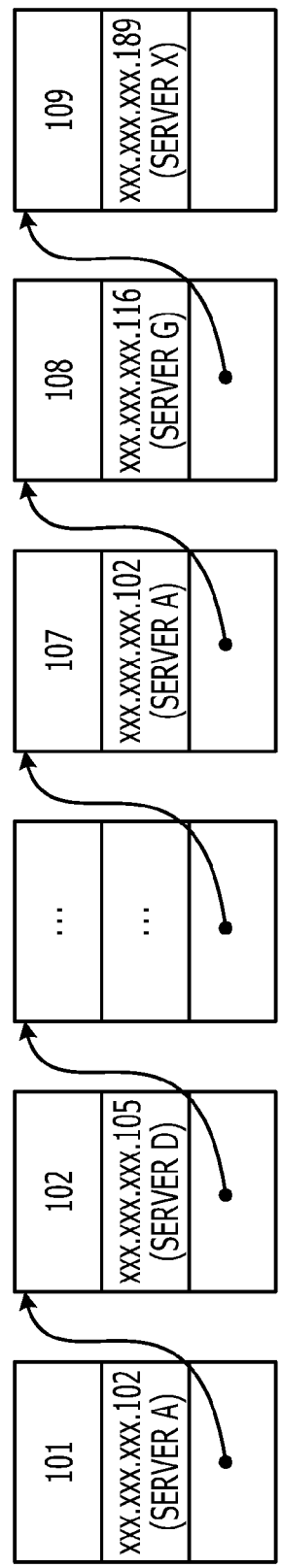
FIG. 6 is a diagram illustrating an example of information that is stored in a transmission read-ahead storage unit.

In FIG. 4, the transmission read-ahead storage unit 52b stores the identifier that is scheduled to be added to the transmission request of the data in association with the destination information corresponding to the scheduled identifier. FIG. 6 is a diagram illustrating an example of information to be stored in the transmission read-ahead storage unit. As illustrated in FIG. 6, the transmission read-ahead storage unit 52b stores the information in a chain structure in which "counter, destination information, next" is a piece of information.

Here, "counter" to be stored indicates an identifier that is scheduled to be added to the transmission request. The minimum counter value that is stored in the transmission read-ahead storage unit 52b is in the beginning of the chain structure. Although "destination information" indicates the IP address of the server as a specific example, the present application is not limited to the example. For example, the destination information may be a host name if the communication is solved by a general communication technique such as DNS. Here, "next" is a pointer that indicates the next data. In FIG. 6, the storage destination of the data included in the transmission request added with 101 as an identifier indicates a server A with xxx.xxx.xxx.102 as the IP address. The storage destination of the data included in the transmission request added with 102 as an identifier indicates the server D with xxx.xxx.xxx.105 as the IP address.

The reception read-ahead storage unit 52c stores the identifier that is scheduled to be added to the reception request of the data in association with the destination information corresponding to the scheduled identifier for each message queue. As with the transmission read-ahead storage unit 52b, the reception read-ahead storage unit 52c stores "counter, destination information, next" as a piece of information in the chain structure. Here, "counter" to be stored indicates an identifier that is scheduled to be added the reception request. The minimum counter value that is stored in the reception read-ahead storage unit 52c is comes in the chain structure. Here, "destination information" indicates the IP address of the server, and "next" is a pointer indicating the next data.

The message storage unit 52d physically stores the data transmitted from the client terminal. FIG. 7 is a diagram illustrating an example of the information that is stored in the message storage unit. As illustrated in FIG. 7, the message storage unit 52d stores the message identifier in association with the data. That is, the message storage unit 52d has a key value store structure in which the message identifier is indicates as key and the data is indicated as Value.

Here, "message identifier" to be stored is an identifier that is assigned to a message to identify the message. Here, "data" is data that is received from the client terminal. In FIG. 7, the queue A indicates that a queue of which the head is data A1 of queue A#0001 and of which the next data is data A2 of queue A#0002 is formed. The queue B indicates that a queue of which the head is data B1 of queue B#0010 is formed.

The reception standby counter 52e stores destination information of the client terminal in order of data reception for each queue name that identifies a message queue. For example, the reception standby counter 52e sequentially stores a pair of "queue name=queue A" and "destination information=IP address of client terminal 10" and a pair of "queue name=queue A" and "destination information=IP address of client terminal 20." In this case, the queue A indicates that a queue is formed in order of the client terminal 10 and the client terminal 20.

The control unit 53 is an electronic circuit such as a processor that performs the OS. The control unit 53 is a processing unit that executes the algorithm such as Chord and also controls the entire server A50. The control unit 53 includes a cluster control unit 54, a type determining unit 55, an open processing unit 56, a message processing unit 57, and a read-ahead control unit 58. In this case, an example of the representative processing that is performed by each processing unit will be described below, and the detail of the processing will be described in the flow of the processing.

The cluster control unit 54 performs the life-and-death monitoring of the server group included in the message queue and the synchronizing processing of the configuration information. The cluster control unit 54 performs various processing to form and maintain the CH space. For example, the cluster control unit 54 uses a protocol such as a Simple Network Management Protocol (SNMP) or another monitoring tool to perform active/inactive monitoring of the server on the CH space to perform the life-and-death monitoring of the server on the CH space. The cluster control unit 54 executes upgrade of the routing table or each read-ahead storage unit depending whether the server is active or inactive on the CH space.

The type determining unit 55 is a processing unit that determines types of the various requests or the replies received from another server or client terminal. For example, the type determining unit 55 determines a type of the message with reference to a communication type included in the header of the message indicating a request or a reply received from another server or client terminal. For example, if the received message requests message queue open, the type determining unit 55 outputs the message to the open processing unit 56. If the received message requests transmission or reception of the data, the type determining unit 55 outputs the message to the message processing unit 57.

The open processing unit 56 is a processing unit that performs each processing for releasing the open request of the message queue requested by the client terminal. For example, the open processing unit 56 performs charge determining processing, transferring processing, and replying processing. The charge determining processing determines whether the own apparatus is in charge of the message queue of the open target, that is, whether the own apparatus is in charge of the open processing. For example, the open processing unit 56 converts the queue name included in the open request into a hash value. The open processing unit 56 determines whether the converted hash value is within the range of the hash value of the own apparatus in charge.

If the own apparatus is not in charge of the open processing, the transferring processing transfers the open request according to the Chord method. For example, according to the routing table that stored in the memory unit 52, the open processing unit 56 transfers the open request to the server clockwise located in the next position to the own apparatus in the CH space. At this time, when receiving the open request directly not from another server but from the client terminal, the open processing unit 56 adds the IP address of the own apparatus as the destination information to the open request and then transfers the open request.

The replying processing replies the destination information of the own apparatus to the client terminal if the open processing is performed by the own apparatus. For example, if the open request is received directly from the client terminal, the open processing unit 56 directly replies the IP address of the own apparatus to the client terminal. If the open request is transferred from the other server, the open processing unit 56 replies the IP address of the own apparatus with respect to the IP address of the transfer source added to the open request. When receiving the IP address from the other server that is in charge of the open request, the open processing unit 56 replies the received IP address to the client terminal.

When receiving the message such as a reception request or a transmission request of the data from the client terminal, the message processing unit 57 performs each processing related to the received message. For example, the message processing unit 57 performs identifier adding processing, destination determining processing, and reply performing processing.

The identifier adding processing generates and adds an identifier having a fixed regularity to the transmission request or the reception request of the data. For example, when receiving the transmission request of the data, the message processing unit 57 extracts the queue name from the transmission request. The message processing unit 57 specifies the counter value corresponding to the extracted queue name and to the attribute "1" from the queue dictionary data storage unit 52*a*. After that, the message processing unit 57 adds the value obtained by incrementing the specified counter value by one as an identifier to the transmission request of the data.

In the similar manner, when receiving the reception request of the data, the message processing unit 57 extracts the queue name from the reception request. The message processing unit 57 specifies the counter value corresponding to the extracted queue name and to the attribute "2" from the queue dictionary data storage unit 52*a*. After that, the message processing unit 57 adds the value obtained by incrementing the specified counter value by one as an identifier to the transmission request of the data.

The destination determining processing determines whether the own apparatus is in charge of the processing of the transmission request or the reception request of the data. For example, according to the identifier added to the transmission request or the reception request by the identifier adding processing or the other server, the message processing unit 57 determines whether the own apparatus is in charge of the processing. More specifically, the message processing unit 57 converts the value obtained by combining the identifier added to the transmission request or the reception request of the data with the queue name included in the request into a hash value. If the value is within the range of the hash value of the own apparatus in charge, the message processing unit 57 determines that the own apparatus is in charge of the processing.

The message processing unit 57 converts the value obtained by combining the identifier added to the received request with the queue included in the request into a hash value. If the value is not within the range of the hash value of the own apparatus in charge, the message processing unit 57 transfers the transmission request added with the identifier to the next server on the CH space. When receiving the IP address from the server that is in charge of the processing, the message processing unit 57 replies the received IP address to the client terminal.

If the combination of "identifier and queue name" is stored in each read-ahead storage unit, the message processing unit 57 obtains the destination information from each read-ahead storage unit and replies the message to the client terminal 10 without transferring the transmission request to the next server.

The read-ahead control unit 58 is a processing unit that updates the transmission read-ahead storage unit 52*b* and the reception read-ahead storage unit 52*c*. For example, when the number of entries to be stored in the transmission read-ahead storage unit 52*b* or the reception read-ahead storage unit 52*c* is smaller than the maximum number, the read-ahead control unit 58 starts read-ahead processing and stores a new entry. When the entry stored in the transmission read-ahead storage unit 52*b* or the reception read-ahead storage unit 52*c* is read out by the message processing unit 57, the read-ahead control unit 58 deletes the entry.

For example, the value of the message identifier generation counter corresponding to the queue A to be stored in the queue dictionary data storage unit 52*a* is "12," and the values of the counter of the queue A stored in the transmission read-ahead storage unit 52*b* are "12," "13," and "14." The transmission read-ahead storage unit 52*b* is assumed to be able to store four entries at most for each queue. In this case, the read-ahead control unit 58 converts "queue name+counter value that is not stored," that is, "queue A+15" into a hash value "AAA." According to the Chord method, the read-ahead control unit 58 retrieves the server that is in charge of the hash value "AAA" from among the servers forming the CH space. After that, the read-ahead control unit 58 stores the IP address of the retrieved server in association with the counter value "15" as an entry of the queue A to be stored in the transmission read-ahead storage unit 52*b*.

For example, the value of the processed management counter corresponding to a queue Z to be stored in the queue dictionary data storage unit 52*a* is "15," and the values of the counter of the queue Z are "16," "17," and "18." The reception read-ahead storage unit 52*c* is assumed to be able to store four entries at most for each queue. In this case, the read-ahead control unit 58 converts "queue name+counter value that is not stored," that is, "queue Z+19" into a hash value "ZZZ." According to the Chord method, the read-ahead control unit 58 retrieves the server that is in charge of the hash value "ZZZ" from among the servers forming the CH space. After that, the read-ahead control unit 58 stores the IP address of the retrieved server in association with the counter value "19" as an entry of the queue Z to be stored in the reception read-ahead storage unit 52*c*.

With reference to FIGS. 8 to 27, a flow of the processing in the system illustrated in FIG. 1 and the like will be described below. A whole flow of each processing, message transition, and flowcharts will be described below. The message transmitted and received in the system includes a communication type, a queue name, a hash value, a transfer source server identifier, destination information, a header unit having a message identifier, and an actual data unit having message actual data.

Figure 8:
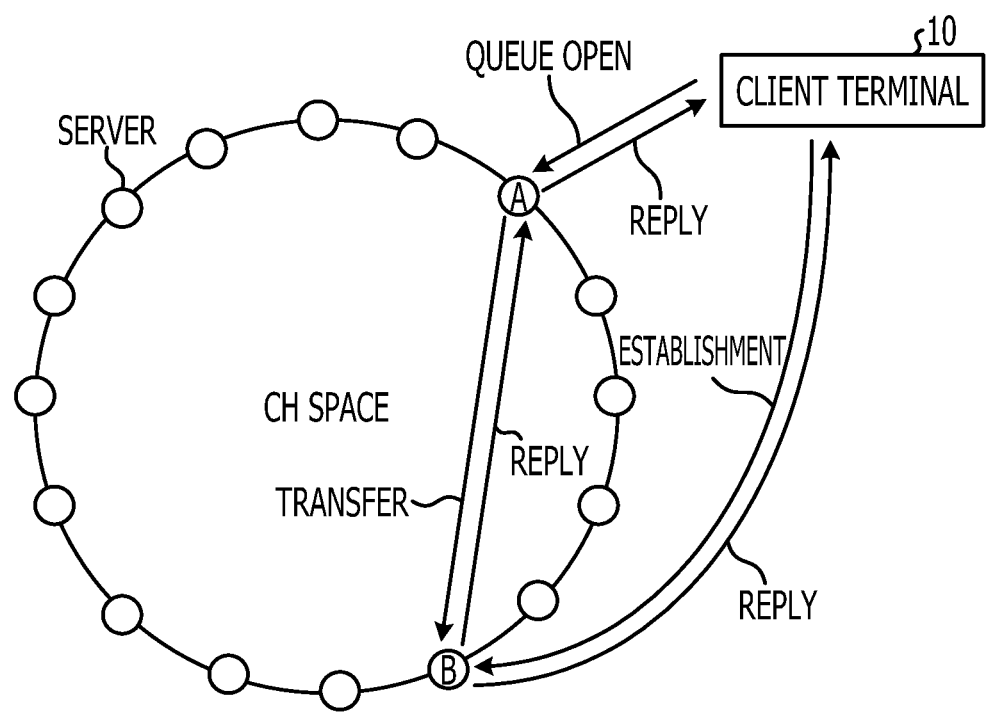
FIG. 8 is a diagram illustrating a whole flow of queue open processing.
Figure 9:
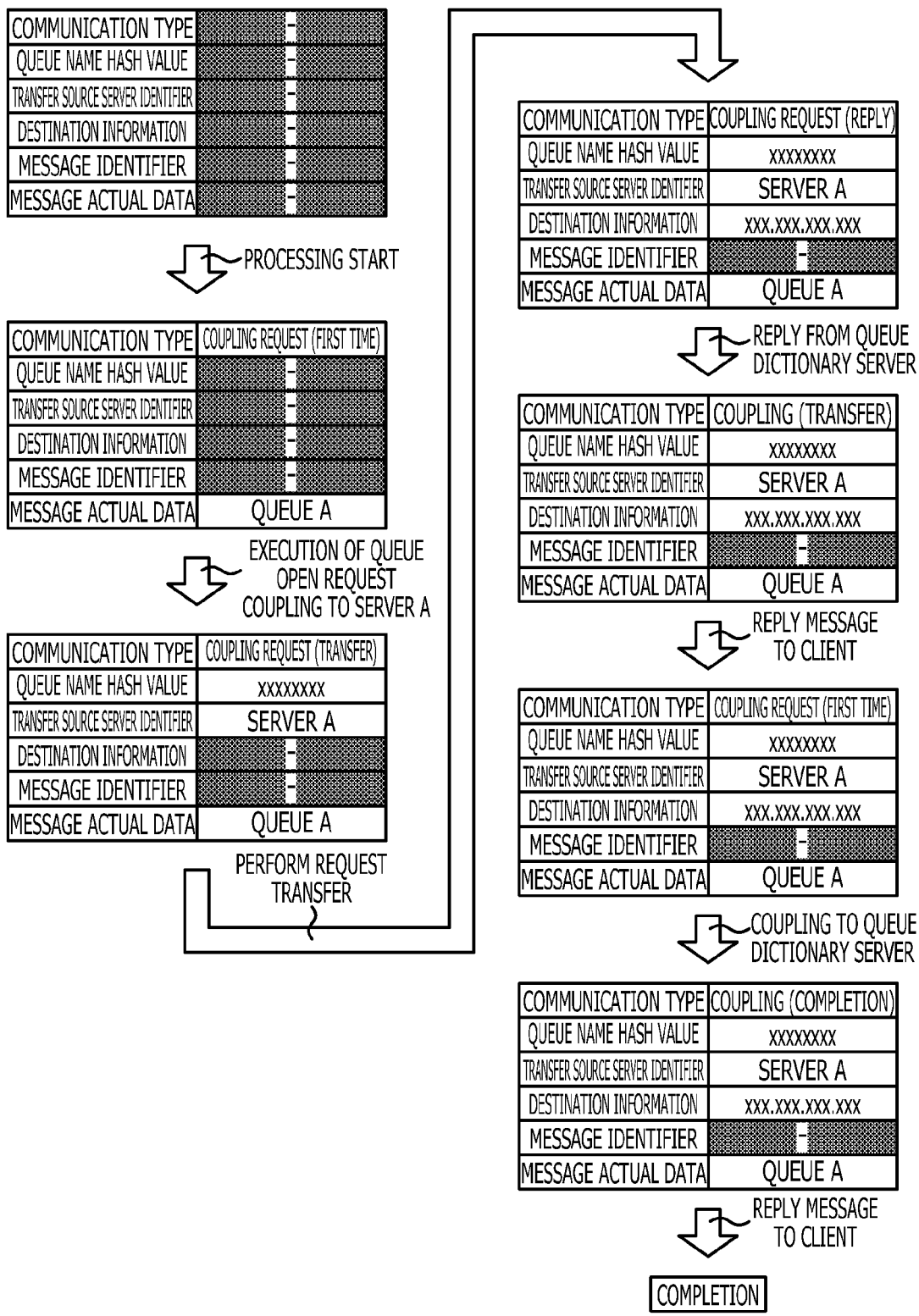
FIG. 9 is a diagram illustrating transition of a message in the queue open processing.

Queue open processing will be described with reference to FIGS. 8 to 13. The queue open processing indicates coupling processing for using a message queue. FIG. 8 is a diagram illustrating a whole flow of the queue open processing. FIG. 9 is a diagram illustrating message transition in the queue open processing. FIGS. 10 to 13 are flowcharts illustrating a flow of the queue open processing. Here, an example in which the client terminal 10 requests queue open processing will be described.

As illustrated in FIG. 8, the client terminal 10 is coupled to an arbitrary server A50 as a participation gateway, and the client terminal 10 specifies the queue A as the queue name of the message queue to execute the open request. More specifically, as illustrated in FIG. 9, the client terminal 10 sets "coupling request (first time)" for each communication type and transmits the message in which "queue A" is set to the message actual data to the server A50. The coupling destination server may be determined by a user's policy.

The type determining unit 55 of the server A50 determines that the requested processing is the open processing based on the communication type of the received message. The open processing unit 56 hashes the queue A as the queue name that is set to the massage actual data to calculate "xxxxxxxx" and searches the CH space according to the routing table held by the own apparatus.

If the own apparatus is not in charge of the specified message queue, the open processing unit 56 adds the identifier thereof to the message and then transfers the message in the CH space according to an algorithm such as Chord.

More specifically, as illustrated in FIG. 9, the open processing unit 56 of the server A changes the setting in such a way that the communication type of the message, in which "queue A" is set to the message actual data, is changed from "coupling request (first time)" to "coupling request (transfer) ." The open processing unit 56 sets "xxxxxxxx" as the calculated hash value to the queue name hash value of the message, sets "server A" to the transfer source server identifier, and transfers the message to the next server. A host name or an IP address may be used as the identifier of the server A. Here, it is assumed that the message is transferred several times to reach the server B60 that is in charge of the message queue.

The type determining unit 65 of the server B60 determines that the requested processing is the open processing based on the communication type of the received message. Based on the value "xxxxxxxx" that is set to the queue name hash value of the received message, the open processing unit 66 determines that the own apparatus is in charge of the specified message queue. The open processing unit 66 sets the IP address and the like of the own apparatus to the destination information of the received message. The open processing unit 66 transfers the received message to the transfer source server that is set to the transfer source server of the message.

More specifically, as illustrate in FIG. 9, the open processing unit 66 of the server B60 generates a message of which the communication type of the message received from the server A50 is changed from "coupling request (transfer)" to "coupling request (reply)." The open processing unit 66 sets an IP address "xxx.xxx.xxx.xxx" to the destination information of the message. After that, the open processing unit 66 transfers the message to which the above-described information is newly set to "server A" that is set to the transfer source server identifier of the message.

The open processing unit 56 of the server A replies the message received from the server B60 to the client terminal 10. More specifically, as illustrated in FIG. 9, the open processing unit 56 of the server A50 changes the setting in such a way that the communication type of the message received from the server B60 is changed from "coupling request (reply)" to "coupling (transfer)" and then transmits the message to the client terminal 10.

Based on the message received from the server A50, the client terminal 10 establishes a connection with the server B60 that is in charge of the specified message queue and executes the open request of the queue. Hereinafter, the client terminal 10 communicates with the queue A by directly communicating with the server B60.

More specifically, as illustrated in FIG. 9, the client terminal 10 changes the setting in such a way that the communication type of the message received from the server A50 is changed from "coupling (transfer)" to "coupling request (first time)." The client terminal 10 transmits the message of which the setting is changed to the IP address "xxx.xxx.xxx.xxx" that is set to the destination information of the received message.

The type determining unit 65 of the server B60 determines that the requested processing is the open processing based on the communication type of the received message. Based on the value "xxxxxxxx" that is set to the queue name hash value of the received message, the open processing unit 66 determines that the own apparatus is in charge of the specified message queue. After that, the open processing unit 66 determines whether the data of the queue A is generated in the queue dictionary data storage unit 52*a*. If there is no queue dictionary data, the open processing unit 66 generates a message identifier generation counter and a processed message management counter. If there is the queue dictionary data or if the queue dictionary data is generated, the open processing unit 66 establishes the connection with the client terminal 10 by generating the message.

More specifically, as illustrated in FIG. 9, the open processing unit 66 of the server B60 changes the setting in such a way that the communication type of the message received from the client terminal 10 is changed from "coupling (first time)" to "coupling (completion)" and then replies the message to the client terminal 10. Hereinafter, the client terminal 10 is able to transmit and receive the message by using the queue A.

Figure 10:
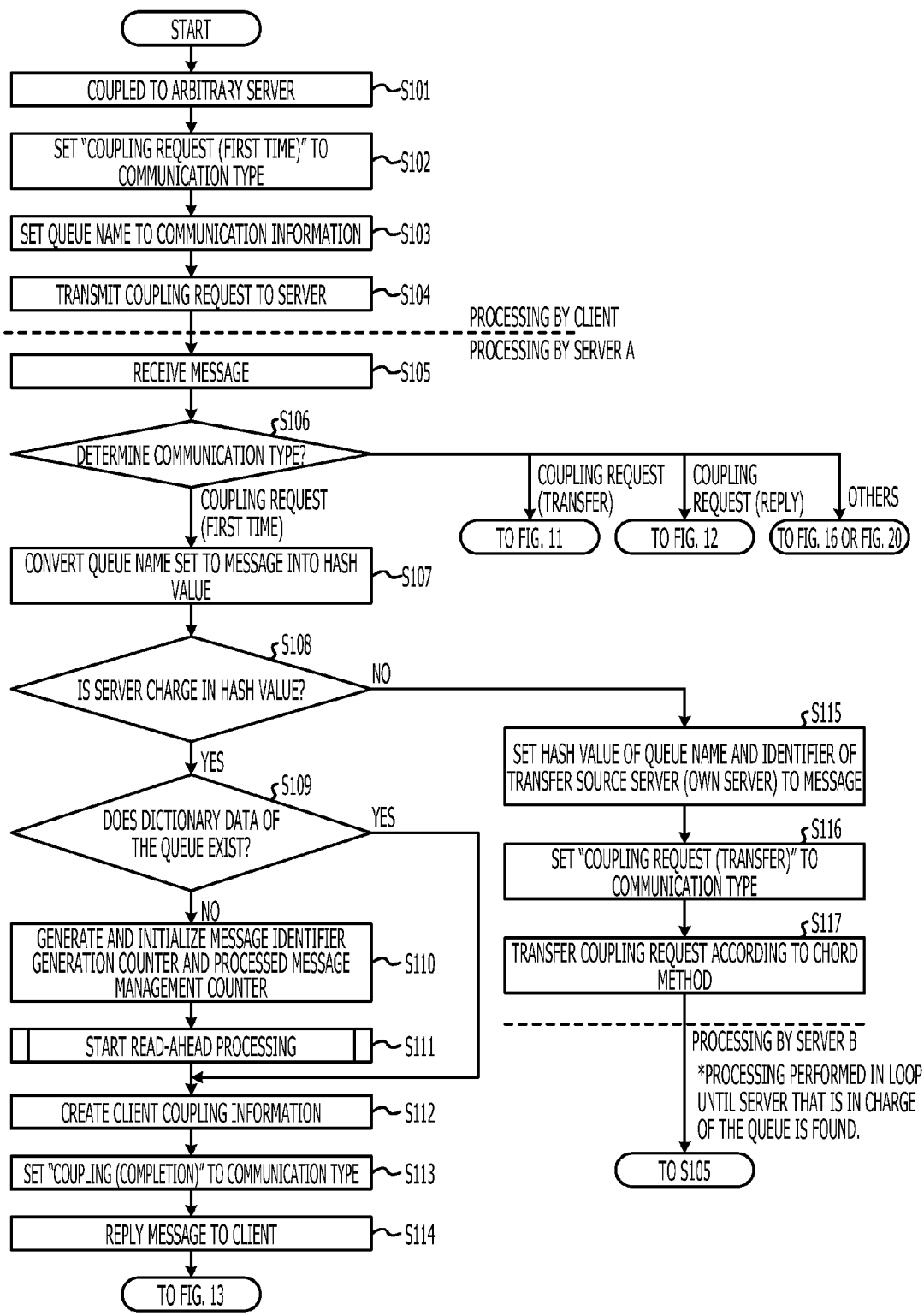
FIG. 10 is a flowchart illustrating a flow of the queue open processing.

With reference to FIGS. 10 to 13A, a flowchart of the above-described processing will be described below. An example in which the client terminal 10 requests the open of the queue A will be described below. As illustrated in FIG. 10, the client terminal 10 is coupled to an arbitrary server A50 (Operation S101). The client terminal 10 sets "coupling request (first time)" to the communication type (Operation S102) and generates the message of which "queue A" is set to the message actual data (Operation S103). The client terminal 10 executes the coupling request by transmitting the generated message to the server A50 (Operation S104).

When receiving the message from the client terminal 10 (Operation S105), the type determining unit 55 of the server A50 determines the communication type with reference to the communication type of the message (Operation S106). If the type determining unit 55 determines the communication type is "coupling request (first time)," the open processing unit 56 converts the queue A that is set to the message actual data of the message into a hash value (Operation S107) and determines whether the server is in charge of the hash value (Operation S108).

When determining that the own server is in charge of the hash value (YES in Operation S108), the open processing unit 56 of the server A50 determines whether the dictionary data of the queue A that is set to the message actual data exists in the queue dictionary data storage unit 52a (Operation S109).

If the dictionary data of the queue A does not exist (NO in Operation S109), the server A50 performs Operation S110 and Operation S111. That is, the open processing unit 56 newly generates and initializes the message identifier counter and the processed message management counter of the queue A. The read-ahead control unit 58 starts the read-ahead processing (Operation S111). If the dictionary data of the queue A exists in the queue dictionary data storage unit 52a (YES in Operation S109), the server A50 performs Operation S112 without performing Operation 5110 and Operation S111.

The open processing unit 56 of the server A50 sets the IP address of the server A to the destination information of the message, generates client terminal coupling information (Operation S112), and sets the communication type of the message to "coupling (completion)" (Operation S113). The open processing unit 56 replies the message generated in Operation S112 and Operation S113 to the client terminal 10 (Operation S114). After that, the processing illustrated in FIG. 13 described below is performed in the client terminal 10.

In Operation S108, if the open processing unit 56 of the server A determines that the own server is not in charge of the open processing (NO in Operation S108), the open processing unit 56 of the server A generates the message to be transferred in Operation S115 and Operation S116. That is, the open processing unit 56 sets the hash value obtained in Operation S107 to the queue name hash value of the message received from the client terminal 10 and also sets a host name and the like used to identify the server A to the transfer source server identifier. The open processing unit 56 generates a message in which "coupling request (transfer)" is set to the communication type.

After that, the open processing unit 56 transfers the generated message, that is, the coupling request to the next server according to the Chord method (Operation S117). When receiving the coupling request, the server performs the processing equivalent to Operation S106 and the following operations.

Figure 11:
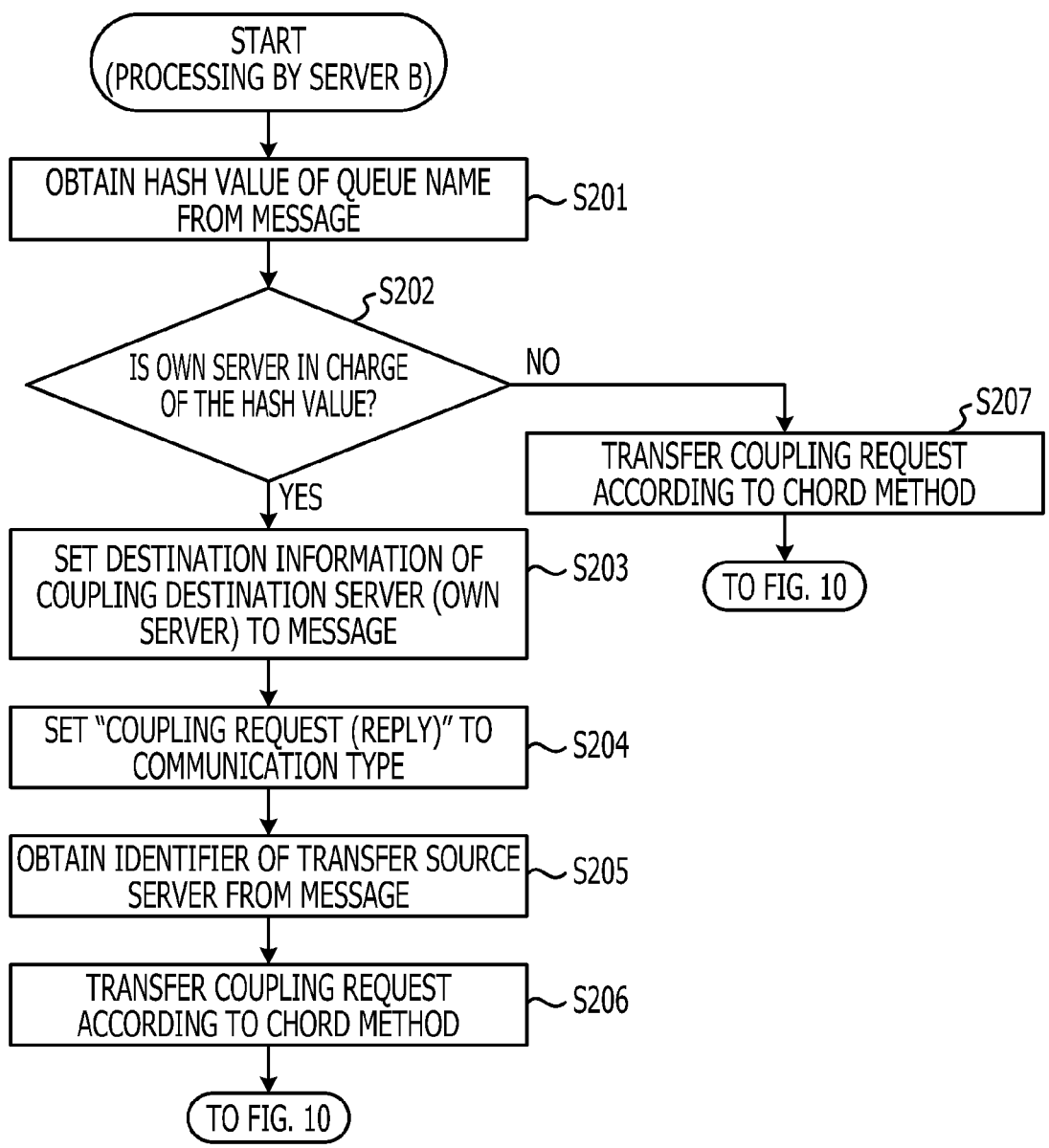
FIG. 11 is another flowchart illustrating the flow of the queue open processing.

In Operation S106, if the type determining unit 55 of a server B50 determines that the communication type is "coupling request (transfer)," the open processing unit 56, as illustrated in FIG. 11, obtains the hash value that is set to the queue name hash value of the received message (Operation S201). The open processing unit 56 determines whether the own server is in charge of the obtained hash value (Operation S202).

If the open processing unit 56 of the server B50 determines that the own server is in charge of the obtained hash value (YES in Operation S202), the open processing unit 56 sets the IP address of the server to the destination information of the received message (Operation S203) and changes the communication type to "coupling request (reply)" (Operation S204). The open processing unit 56 obtains the identifier that is set to the transfer source server identifier of the received message (Operation S205) and then transfers, according to the Chord method, the message generated in Operation S203 and Operation S204 to the server corresponding to the obtained identifier (Operation S206). When receiving the coupling request, the server performs the processing in Operation S106 and the following operations illustrated in FIG. 10.

If the open processing unit 56 of the server B50 determines that the own server is not in charge of the obtained hash value (NO in Operation S202), the open processing unit 56 transfers the received message to the next server according to the Chord method (Operation S207). When receiving the coupling request, the server performs the processing in Operation 106 and the following operations illustrated in FIG. 10.

Figure 12:
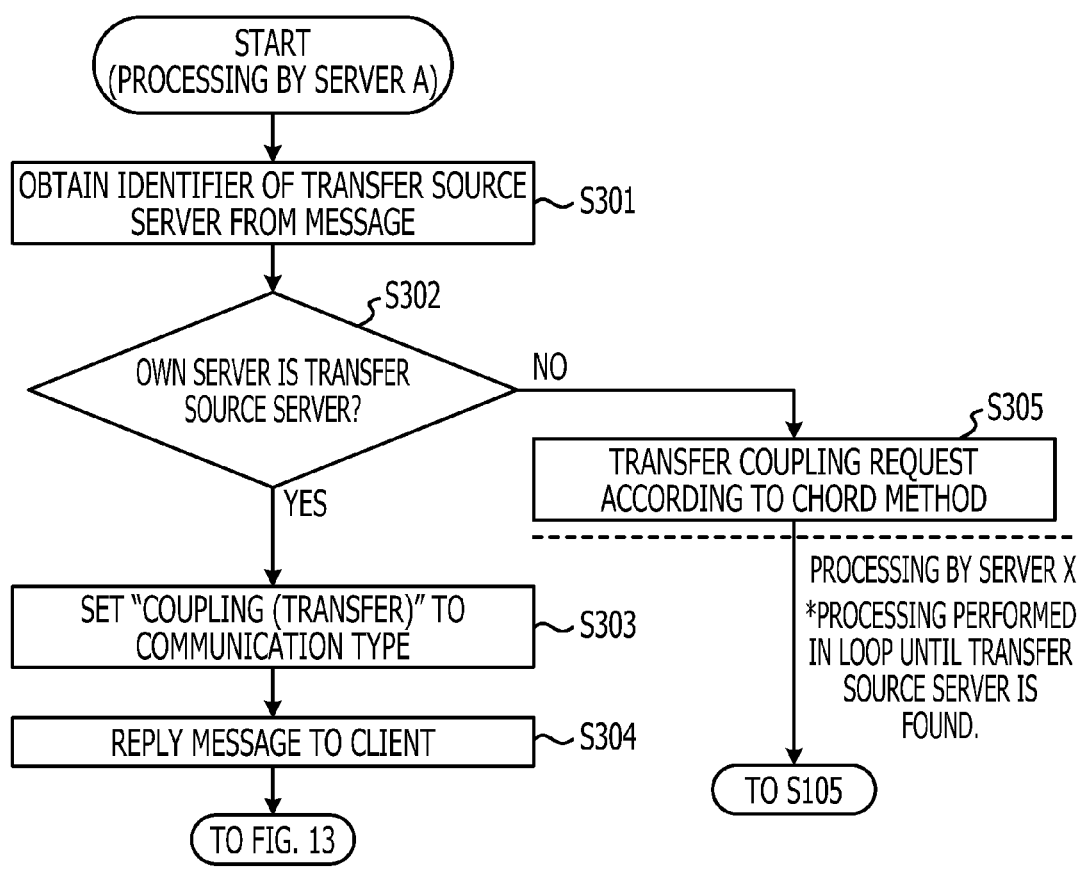
FIG. 12 is another flowchart illustrating the flow of the queue open processing.

In Operation S106 in FIG. 10, if the type determining unit 55 of the server A50 determines that the communication type is "coupling request (reply)," the open processing unit 56, as illustrated in FIG. 12, obtains the identifier that is set to the transfer source server identifier of the received message (Operation S301).

If the open processing unit 56 of the server A50 determines that the obtained identifier is the identifier of the own server (YES in Operation S302), the open processing unit 56 changes the communication type of the received message to "coupling (transfer" (Operation S303) and replies the message to the client terminal 10 (Operation S304). After that, the processing illustrated in FIG. 13 described below is performed in the client terminal 10.

If the open processing unit 56 of the server A50 determines that the obtained identifier is not the identifier of the own server (NO in Operation S302), the open processing unit 56 transfers the message to the next server according to the Chord method (Operation S305). After that, when receiving the coupling request, the server performs the processing in Operation S106 and the following operations illustrated in FIG. 10.

Figure 13:
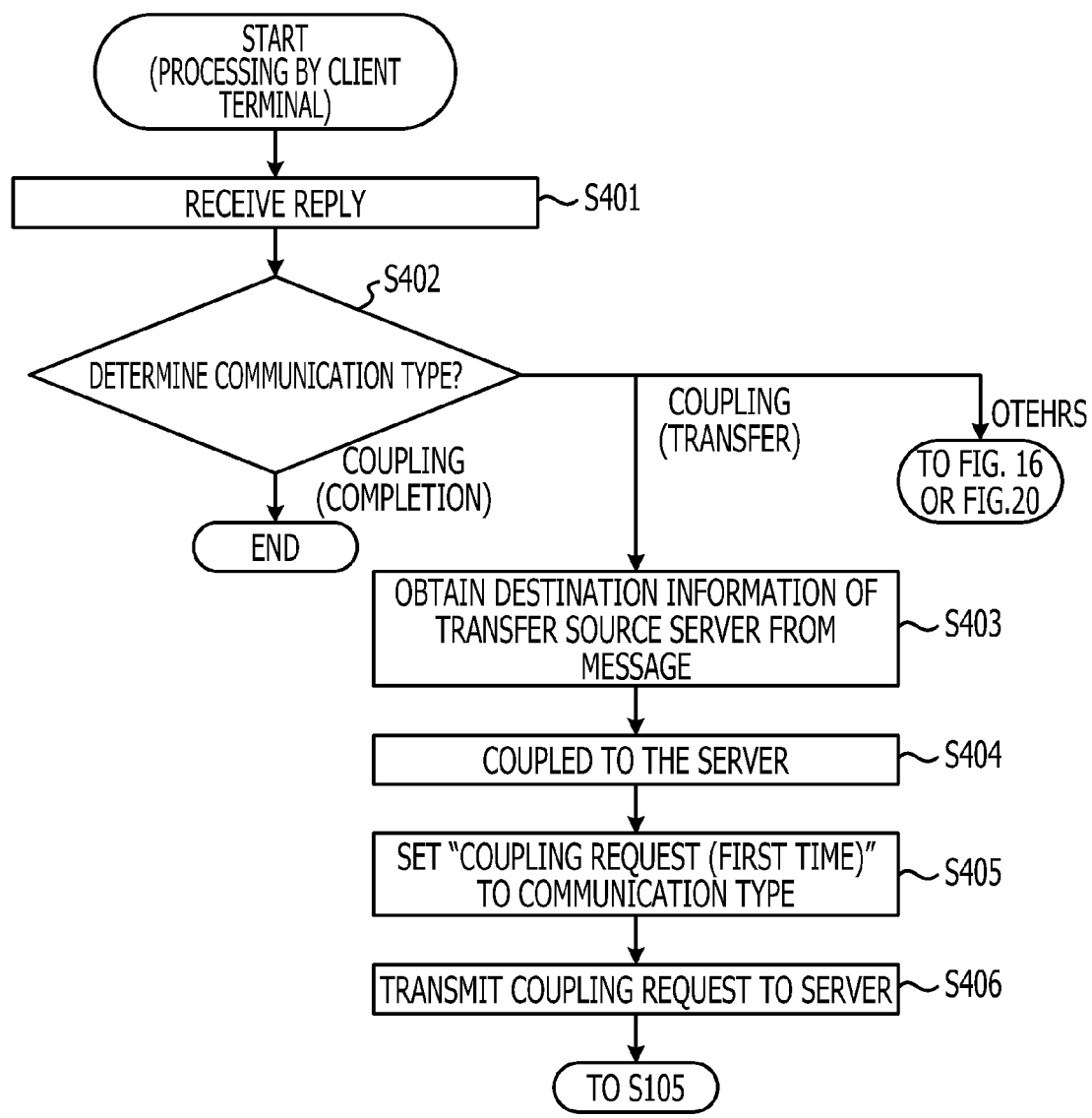
FIG. 13 is another flowchart illustrating the flow of the queue open processing.

When receiving the message transmitted in Operation S114 in FIG. 10 or Operation S304 illustrated in FIG. 12, the client terminal 10 performs the processing illustrated in FIG. 13. As illustrated in FIG. 13, the client terminal 10 receives a message from the server A50 and the like (Operation S401) and determines the communication type of the received message (Operation S402).

If "coupling (completion)" is set to the communication type of the message, the client terminal 10 ends the processing. If "coupling (transfer)" is set to the communication type of the message, the client terminal 10 obtains the information that is set to the destination information of the message (Operation S403). The client terminal 10 is coupled to the server as the destination by using the obtained information (Operation S404). The client terminal 10 sets "coupling request (first time)" to the communication type of the received message (Operation S405) and executes the coupling request with respect to the coupled server (Operation S406).

Figure 16:
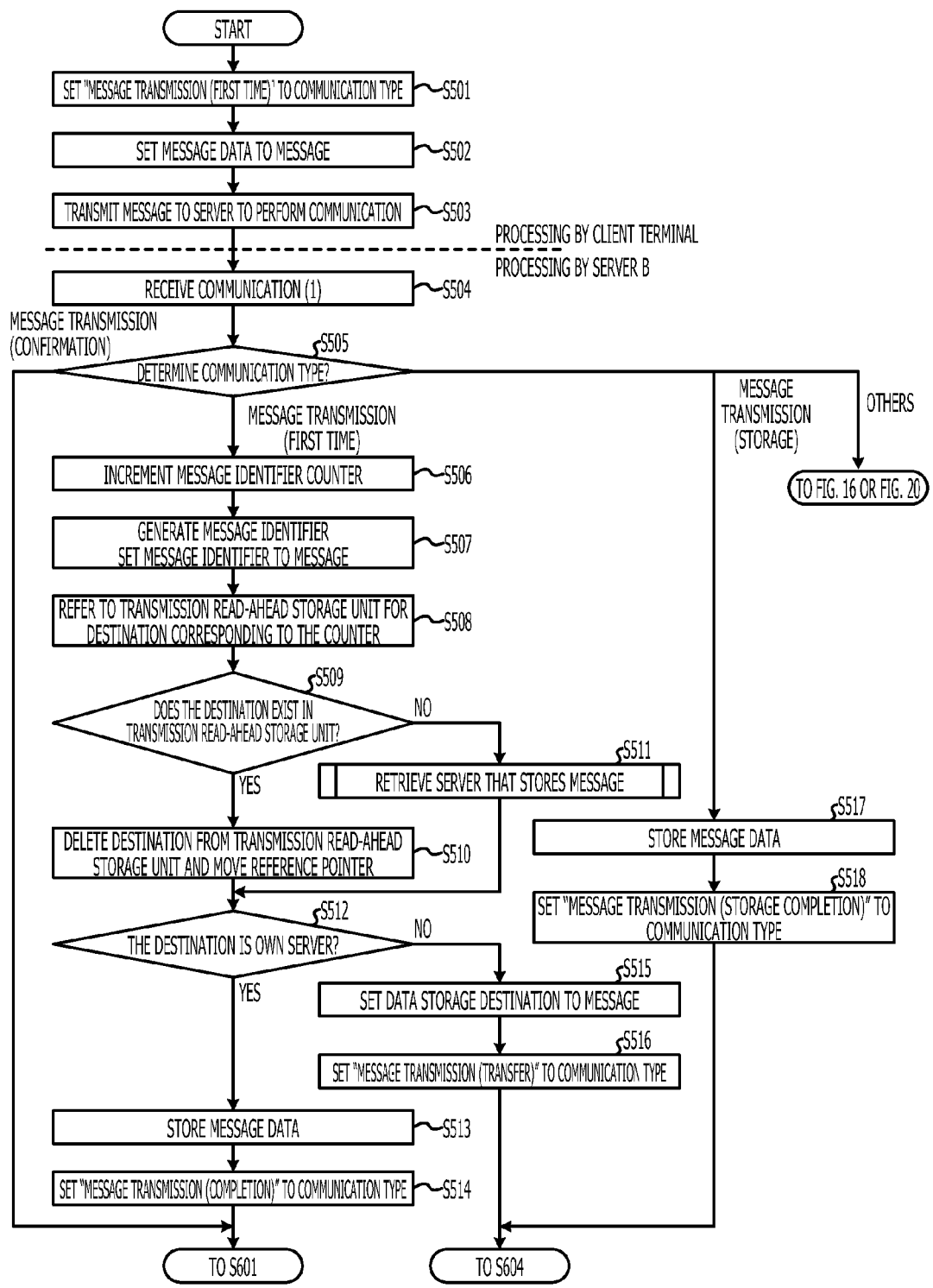
FIG. 16 is a flowchart illustrating a flow of the data transmitting processing.
Figure 20:
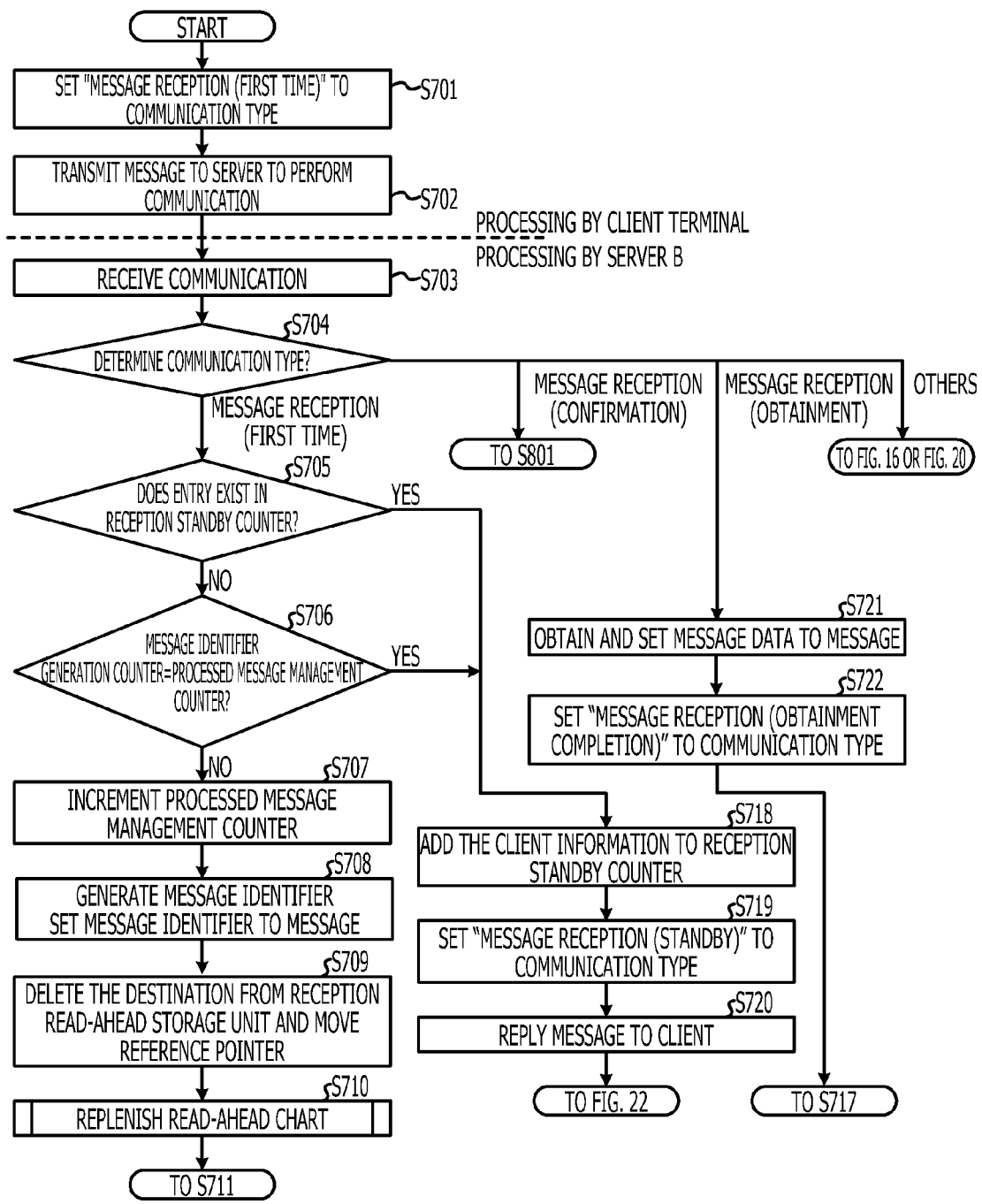
FIG. 20 is a flowchart illustrating the flow of the data receiving processing.

If the communication type of the message is not "coupling (completion)" or "coupling (transfer)," the client terminal 10 performs the processing illustrated in FIG. 16 or FIG. 20. In Operation S106, if the communication type of the message is not "coupling request (first time)," "coupling request (transfer)," or "coupling request (reply)," the server A performs the processing illustrated in FIG. 16 or FIG. 20.

Figure 14:
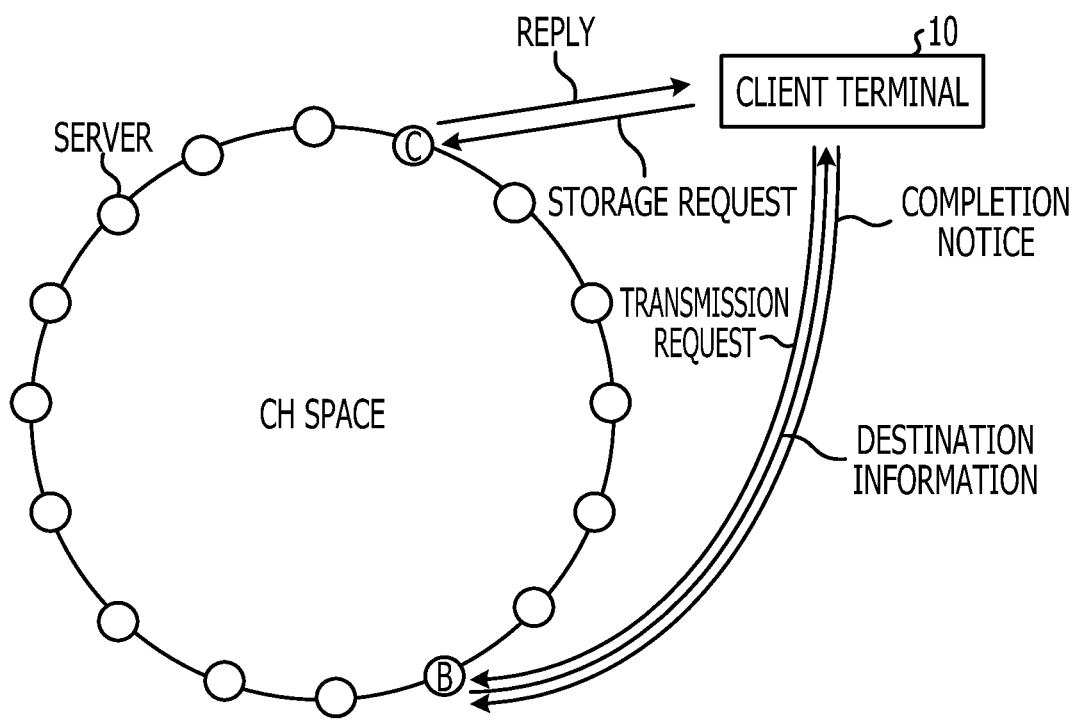
FIG. 14 is a diagram illustrating a whole flow of data transmitting processing with respect to a message queue.
Figure 15:
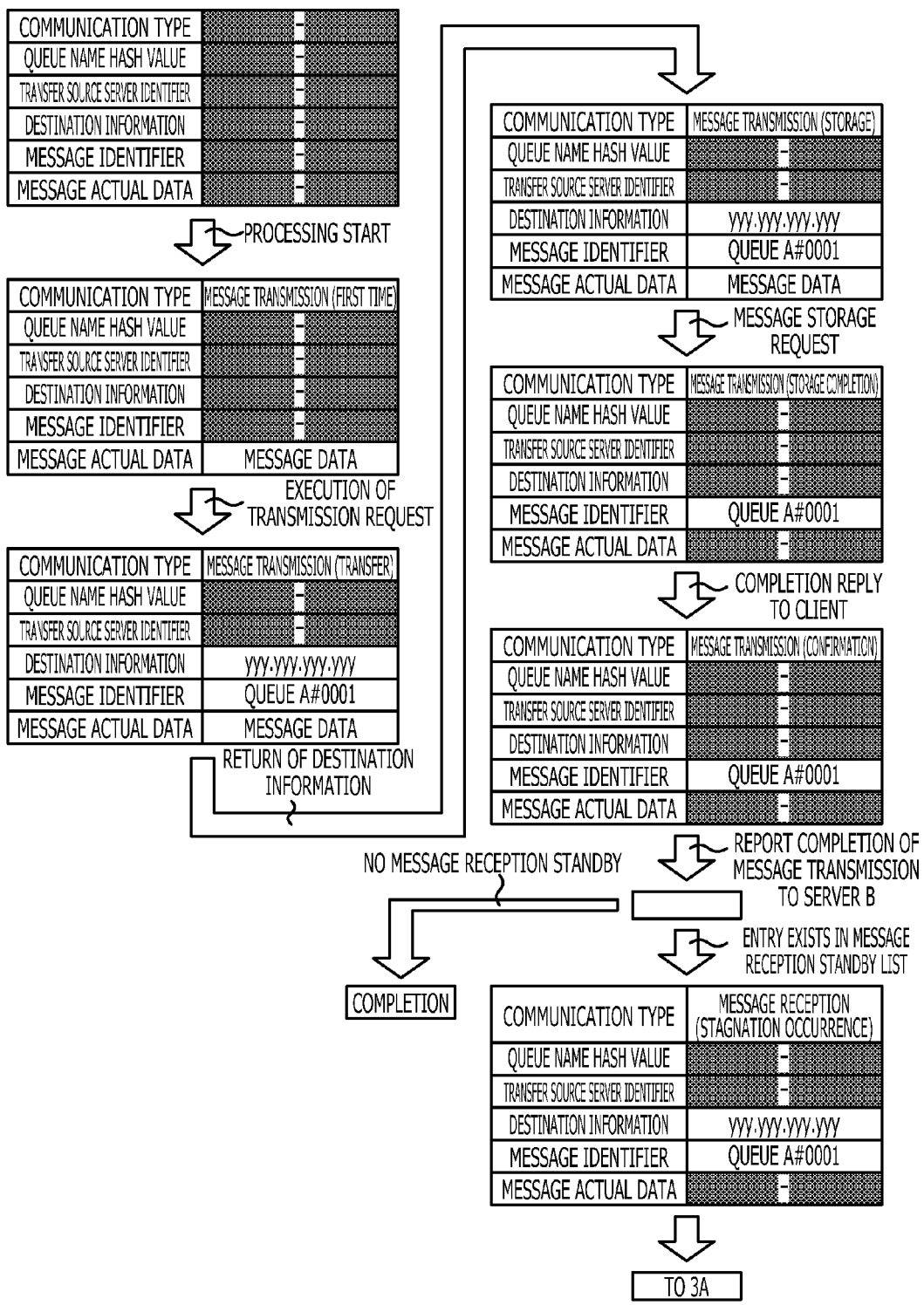
FIG. 15 is a diagram illustrating the transition of the message in the data transmitting processing.
Figure 17:
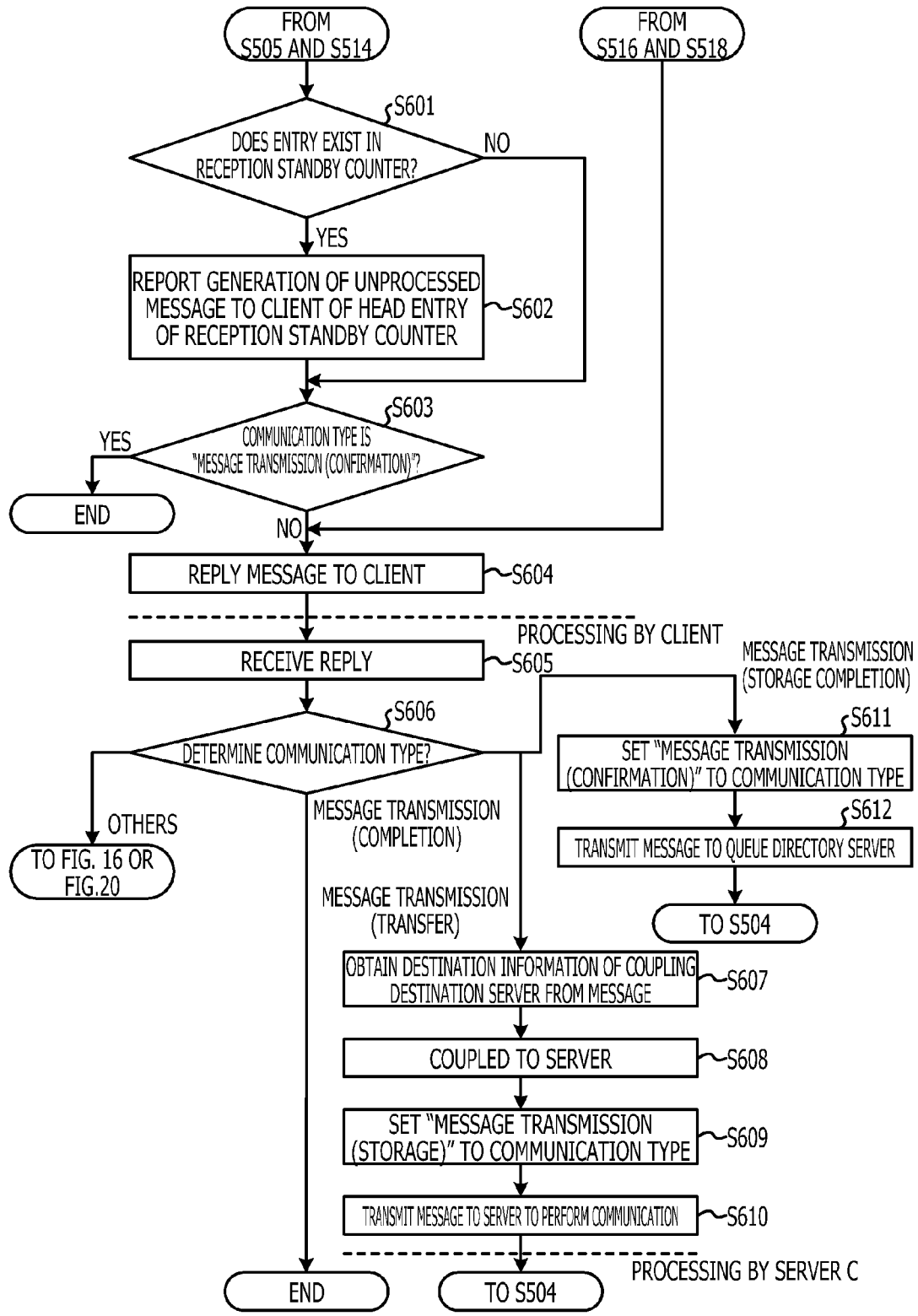
FIG. 17 is another flowchart illustrating the flow of the data transmitting processing.

With reference to FIGS. 14 to 17, the processing for transmitting the data to the message queue performed by the client terminal 10 will be described below. FIG. 14 is a diagram illustrating a whole flow of data transmitting processing with respect to the message queue. FIG. 15 is a diagram illustrating message transition in the data transmitting processing. FIGS. 16 and 17 are flowcharts illustrating a flow of the data transmitting processing. The client terminal 10 explains an example in which data transmission to the queue A with respect to the server B60 will be described below.

As illustrated in FIG. 14, the client terminal 10 executes the message transmission request that specifies the queue name with respect to the server B60. More specifically, as illustrated in FIG. 15, the client terminal 10 sets "message transmission (first time)" to the communication type. The client terminal 10 transmits the message in which "message data" is set to the message actual data to the server B60. The message data is transmission target data.

A message processing unit 67 of the server B60 increases the message identifier generation counter corresponding to the queue A by one and retrieves the transmission read-ahead storage unit 52b based on the following counter value as a key. If the IP address corresponding to the counter value is not found from the transmission read-ahead storage unit 52b, the message processing unit 67 converts "queue name+counter" as a key into a hash value. The message processing unit 67 starts the routing according to the Chord method and retrieves the server that is in charge of the hash value. If the IP address corresponding to counter value is found from the transmission read-ahead storage unit 52b, the message processing unit 67 deletes the data from the transmission reading storage unit 52b.

The message processing unit 67 of the server B60 replies the destination information of the storage destination server of the data to the client terminal 10. More specifically, as illustrated in FIG. 15, the message processing unit 67 changes the communication type of the message received from the client terminal 10 to "message reception (transfer)" and sets the IP address "yyy.yyy.yyy.yyy" of the server C70 specified by the Chord method to the destination information. The message processing unit 67 sets "queue name #0001," which indicates "queue name+coutner" used to retrieve the server in charge, to the message identifier of the message. After that, the message processing unit 67 replies the message generated in this manner to the client terminal 10. If the server B60 is the storage destination server, the message processing unit 67 replies a storage result of the data.

At this time, the message processing unit 67 determines that the client terminal that is in a standby state after executing the message reception request exists if there is an entry of the queue A in a reception standby counter. Therefore, the message processing unit 67 reports an occurrence event of an unprocessed message to the client terminal to complete the reception of the entry.

The client terminal 10 performs the communication with the server C70 based on the received destination information. More specifically, as illustrated in FIG. 15, the client terminal 10 transmits, to the server C70, the message in which the communication type of the message received from the server B60 is changed to "message transmission (storage)."

When receiving the message from the client terminal 10, the server C70 stores the message data in association with the queue A and then replies the result to the client terminal 10. More specifically, as illustrated in FIG. 15, the server V70 changes the communication type of the received message to "message (storage completion)" and transmits, to the client terminal 10, the message of which the destination information and the message actual data are initialized.

After that, the client terminal 10 reports the message transmission, that is, the completion of the data storage to the server B60. More specifically, as illustrated in FIG. 15, the client terminal 10 changes the communication type of the message received from the server C70 to "message transmission (confirmation)" and then transmits the message to the server B60.

At this time, if the server B60 is a message reception standby state, that is, if the entry corresponding to the queue A exists in the reception standby counter 52e, the server B60 updates the message received from the client terminal 10 and then reports the message to a reception standby client terminal. More specifically, as illustrated in FIG. 15, the server B60 changes the communication type of the message received from the client terminal 10 to "message reception (stagnation occurrence)" and reports the message in which the IP address "yyy.yyy.yyy.yyy" of the server C is set to the destination information to the reception standby client terminal.

With reference to FIGS. 16 and 17, the flowchart of the above-described processing will be described below. In this case, the processing is assumed to be performed after the message queue A is specified. As illustrated in FIG. 16, the client terminal 10 sets "message transmission (first time)" to the communication type (Operation S501), stores "message data" in the message actual data (Operation S502), and transmits the message to the server B60 to perform the communication (Operation S503).

The type determining unit 65 of the server B60 receives the message from the client terminal 10 (Operation S504) and then determines the communication type with reference to the communication type of the message (Operation S505). If the type determining unit 65 determines that the communication type is "message transmission (first time)," the message processing unit 67 increments the message identifier counter that is to be stored in the queue dictionary data storage unit 52a in association with the queue A (Operation S506). The message processing unit 67 generates a message identifier indicating "queue name+counter value" and then sets the message identifier to the message identifier of the message received from the client terminal 10 (Operation S507). The message processing unit 67 refers to the transmission read-ahead storage unit 52b based on the counter value included in the generated message identifier as a key (Operation S508).

If the destination information corresponding to the message identifier is stored (YES in Operation S509), the message processing unit 67 of the server B60 deletes the information from the transmission read-ahead storage unit 52b and moves a reference pointer (Operation S510). If the destination information corresponding to the message identifier is not stored (NO in Operation S509), the message processing unit 67 converts "queue name+counter value" into a hash value. After retrieving the server in charge that stores the message according to the Chord method (Operation S511), the message processing unit 67 performs Operation S512.

If the destination is the own server, that is, if the storage destination of the data is the won server (YES in Operation S512), the message processing unit 67 performs Operation S513. That is, the message processing unit 67 stores "message data" to be stored in the message actual data of the received message in the message storage unit 52d in association with the queue name. The message processing unit 67 changes the communication type of the received message to "message transmission (completion)" (Operation S514) and performs the processing illustrated in FIG. 17.

If the destination is not the own server, that is, if the storage destination of the data is not the own server (NO in Operation S512), the message processing unit 67 of the server B60 performs Operation S515. That is, the message processing unit 67 sets the IP address of the server C70 specified by the Chord method to the destination information of the received message. The message processing unit 67 changes the communication type of the message to "message transmission (transfer)"(Operation S516) and then performs the processing in Operation S604 and the following operations illustrated in FIG. 17.

In Operation S505, if the type determining unit 65 determines that the communication type is "message transmission (storage)," the message processing unit 67 performs Operation S517. That is, the message processing unit 67 stores the "message data," which is to be stored in the message actual data of the received message, in the message storage unit 52d in association with the queue name. The message processing unit 67 changes the communication type of the received message to "message transmission (storage completion)" (Operation S518) and performs the processing in Operation S604 and the following operations illustrated in FIG. 17.

In Operation S505, if the type determining unit 65 determines that the communication type is "message (confirmation)," the message processing unit 67 performs the processing illustrated in FIG. 17 without performing Operations S506 to S518. In Operation S505, the communication type is not "message transmission (storage)," "message (first time)," or "message (confirmation)," the message processing unit 67 performs the processing illustrated in FIG. 16 or FIG. 17.

As illustrated in FIG. 17, if the entry corresponding to the queue A is stored in the reception standby counter 52e (YES in Operation S601), the message processing unit 67 of the server B60 performs Operation S602. That is, the message processing unit 67 reports the occurrence event of the unprocessed message to the client terminal of the entry to be stored in the reception standby counter 52e. More specifically, the message processing unit 67 transmits, to the client terminal, the message in which the communication type of the message generated in FIG. 16 is changed to "message reception (stagnation occurrence)." If the entry corresponding to the queue A is not stored in the reception standby counter 52e (NO in Operation S601), the message processing unit 67 performs Operation S603 without performing Operation S602.

The message processing unit 67 of the server B60 determines whether the communication type of the message as a processing target is "message transmission (confirmation)" (Operation S603). If the communication type is "message transmission (confirmation)" (YES in Operation S603), the message processing unit 67 ends the processing.

If the communication type is not "message transmission (confirmation)" (NO in Operation 603),
(NO in Operation S603), the message processing unit 67 of the server B60 replies the target message, that is, the message identifier generated in FIG. 16 and the like, and the IP address to the client terminal 10 (Operation S604).
The client terminal 10 receives the reply from the server B60 (Operation S605) and then determines the communication type of the message as the received reply (Operation S606). If the communication type of the message is "message transmission (completion)," the client terminal 10 ends the processing.

If the communication type of the message is "message transmission (transfer)," the client terminal 10 obtains the IP address that is set to the destination information of the message (Operation S607). The client terminal 10 is coupled to the server C60 corresponding to the obtained IP address (Operation S608). The client terminal 10 changes the communication type of the received message to "message transmission (storage)" (Operation S609) and then performs the communication by transmitting the message to the server C60 (Operation S610).

If the communication type of the message is "message transmission (storage completion)," the client terminal 10 changes the communication type of the message to "message transmission (confirmation)" (Operation S611) and then transmits the message to the server B60 as a queue directory server (Operation S612).

If the communication type of the message is not "message transmission (completion)," "message transmission (transfer)," or "message transmission (storage completion)," the client terminal 10 performs the processing illustrated in FIGS. 16 and 20.

Figure 18:
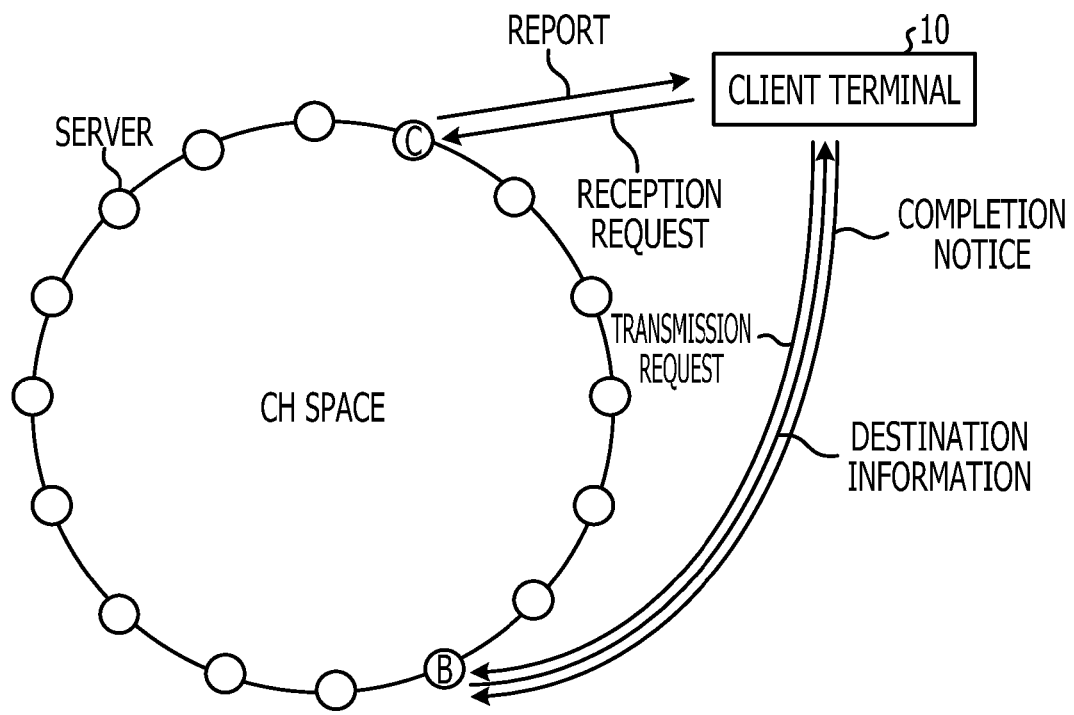
FIG. 18 is a diagram illustrating the whole flow of data receiving processing with respect to the message queue.
Figure 19:
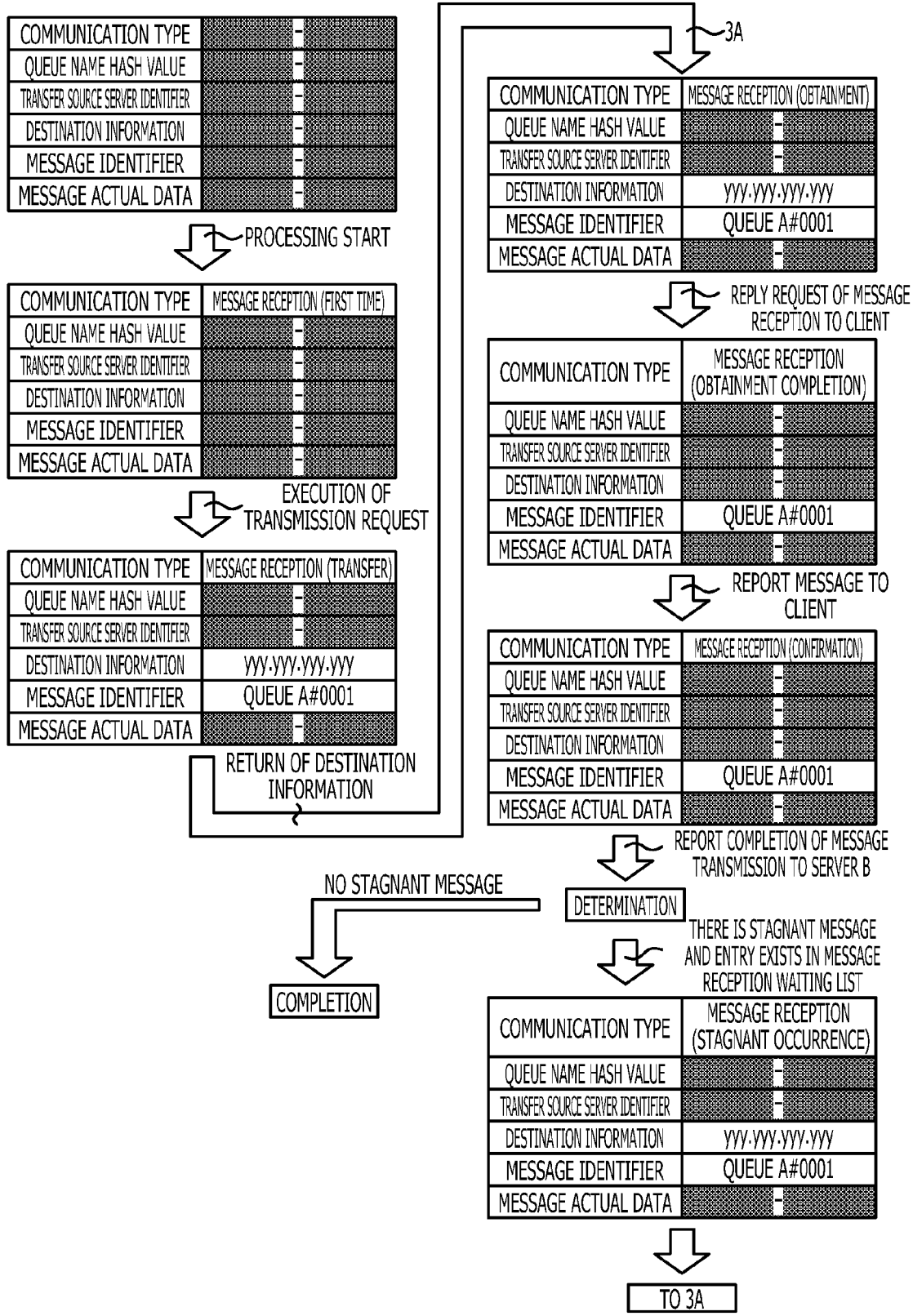
FIG. 19 is a diagram illustrating the transition of the message in the data receiving processing.
Figure 21:
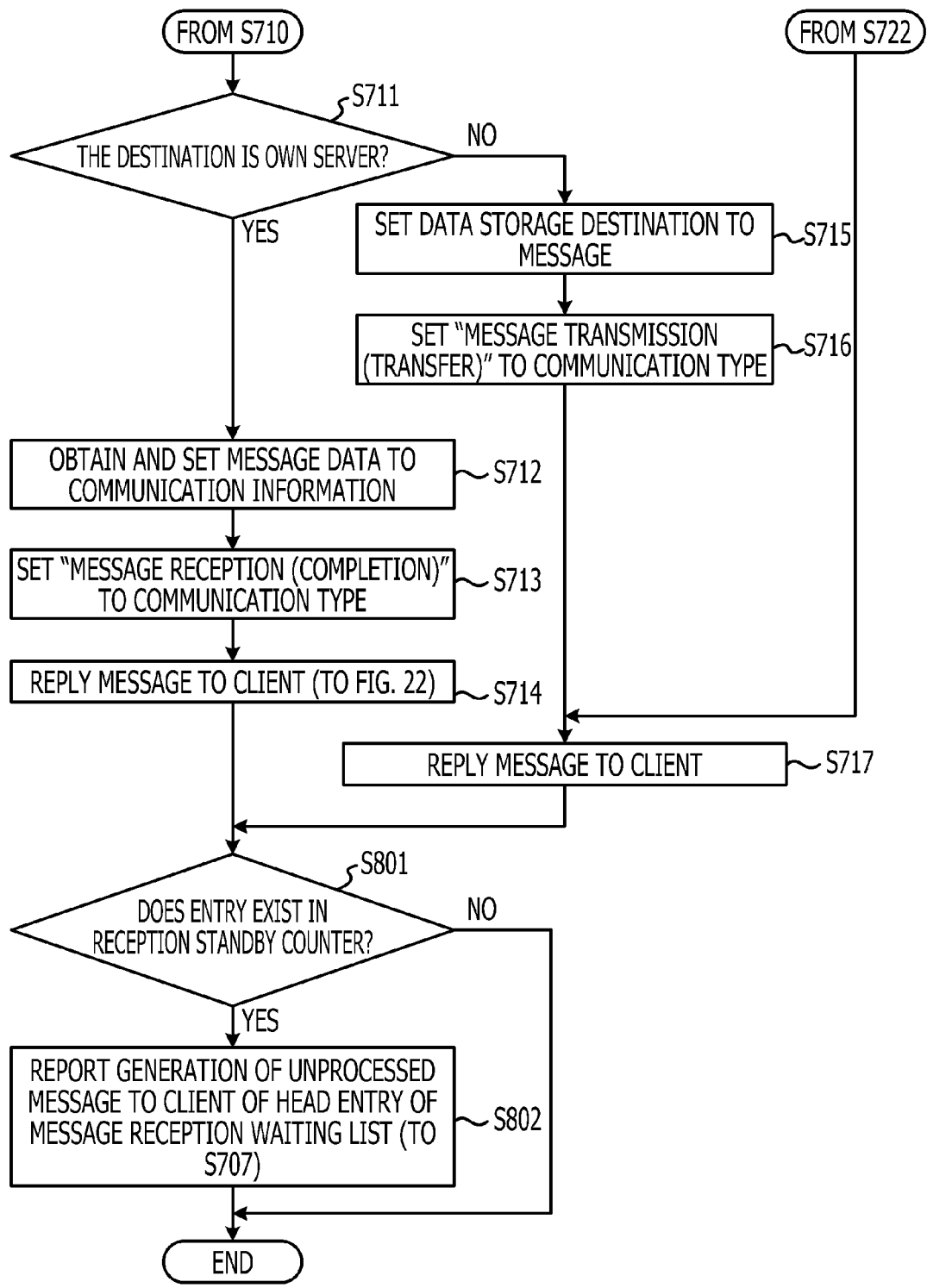
FIG. 21 is another flowchart illustrating the flow of the data receiving processing.
Figure 22:
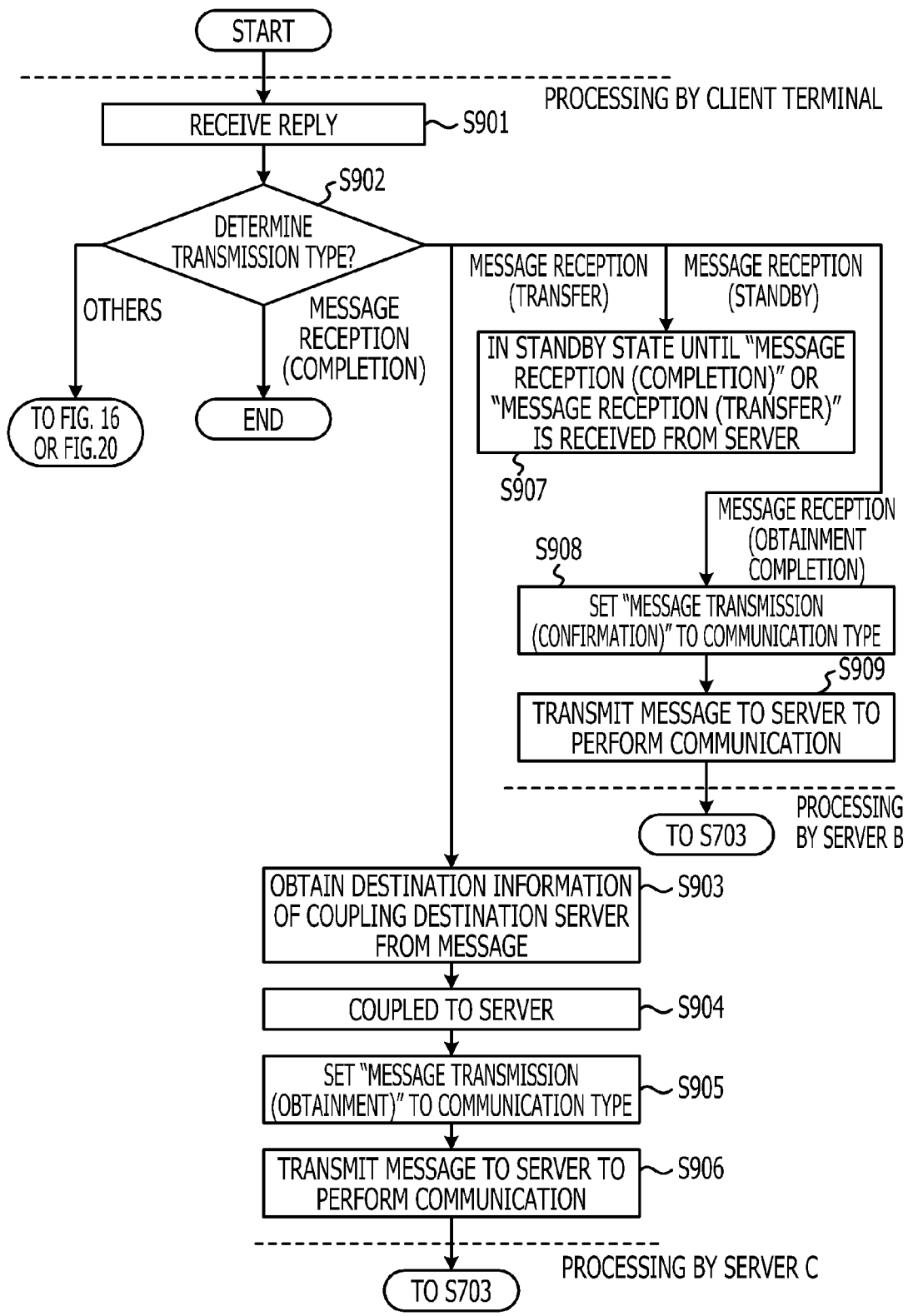
FIG. 22 is another flowchart illustrating the flow of the data receiving processing.

With reference to FIGS. 18 to 22, the processing by the client terminal 10 for receiving the data from the message queue will be described below. FIG. 18 is a diagram illustrating a whole flow of data receiving processing with respect to the message queue. FIG. 19 is a diagram illustrating a message transition in the data receiving processing. FIGS. 20 to 22 are flowcharts illustrating a flow of the data receiving processing. In this case, an example in which the client terminal 10 receives the data from the queue A as the queue name will be described below.

As illustrated in FIG. 18, the client terminal 10 executes the message reception request by which the queue name is specified with respect to the server B60. More specifically, as illustrated in FIG. 19, the client terminal 10 transmits, to the server B60, the message in which "message reception (first time)" is set to the communication type. The message data is the transmission target data.

The message processing unit 67 of the server B60 compares the value of the message identifier generation counter corresponding to the queue A to the value of the processed message management counter. If the values are substantially the same, the message processing unit 67 determines that there is no unprocessed message. The message processing unit 67 stores the queue name and client identification information as client information in the reception standby counter 52e and then temporally replies the message to the client terminal 10. At this time, the client terminal 10 is in the standby state until the occurrence event of the unprocessed message is reported from the server B60. The IP address, the process ID, and the like may be used as the client identification information.

If the value of the message identifier generation counter is larger than the value of the processed message management counter, the message processing unit 67 increments the value of the processed message management counter. The message processing unit 67 retrieves the reception read-ahead storage unit 52c based on the value of the counter as a key. If there is no hit in the retrieval, the message processing unit 67 converts "queue name+counter value" into a hash value and retrieves according to the Chord method to obtain the destination information. If there is a successful hit in the retrieval, the message processing unit 67 deletes the entry from the reception read-ahead storage unit 52c.

The message processing unit 67 of the server B60 replies the destination information of the storage destination server of the data to the client terminal 10. More specifically, as illustrated in FIG. 19, the message processing unit 67 changes the communication type of the message received from the client terminal 10 to "message reception (transfer)." The message processing unit 67 sets the IP address "yyy.yyy.yyy.yyy" of the server C70 specified by the Chord method to the destination information. The message processing unit 67 sets "queue name #0001," which indicates "queue name+ counter" as the queue used to retrieve the server in charge, to the message identifier of the message. After that, the message processing unit 67 replies the message generated in this manner to the client terminal 10. If the server B60 is the storage destination server, the message processing unit 67 replies a storage result of the data.

The client terminal 10 performs the communication with the server C70 based on the received destination information. More specifically, as illustrated in FIG. 19, the client terminal 10 transmits, to the server C70, the message in which the communication type of the message received from the server B60 is changed to "message transmission (obtainment)."

The server C70 that receives the message from the client terminal C10 replies, to the client terminal 10, the data to be stored in the message storage unit 52d in association with the queue A. More specifically, as illustrated in FIG. 19, the server C70 changes the communication type of the received message to "message (obtainment completion)." The server C70 stores, in the message actual data, "message data" obtained from the message storage unit 52d. Further, the server C70 initializes and transmits the destination information of the message to the client terminal 10.

The client terminal 10 reports the message reception indicating the completion of the data obtainment to the server B60. More specifically, as illustrated in FIG. 19, the client terminal 10 changes the communication type of the message received from the server C70 to "message reception (confirmation)" and then transmits the message to the server B60.

If the server B60 is in the message reception standby state, that is, if the entry corresponding to the queue A exists in the reception standby counter 52e, the server B60 updates and reports the message received from the client terminal 10 to the reception standby client terminal. More specifically, as illustrated in FIG. 19, the server B60 changes the communication type of the message received from the client terminal 10 to "message reception (stagnation occurrence)." The server B60 reports the message in which the IP address "yyy.yyy.yyy.yyy" of the server C is set to the destination information to the reception standby client terminal.

With reference to FIGS. 20 and 21, the flowchart of the above-described processing will be described below. In this case, the processing is performed after the message queue A is specified. As illustrated in FIG. 20, the client terminal 10 sets "message reception (first time)" to the communication type (Operation S701) and then transmits the message to the server B60 to perform the communication (Operation S702).

The type determining unit 65 of the server B60 receives the message from the client terminal 10 (Operation S703) and then determines the communication type with reference to the communication type of the message (Operation S704). If the type determining unit 65 determines that the communication type is "message reception (first time)", the message processing unit 67 determines whether the entry associated with the queue A exists in the reception standby counter 52e (Operation S705).

If the entry does not exist in the reception standby counter 52e (NO in Operation S705), the message processing unit 67 of the server B60 performs Operation S706 with reference to the queue dictionary data storage unit 52a. That is, the message processing unit 67 determines whether the value of the message identifier generation counter corresponding to the queue A matches the value of the processed message management counter.

If the values do not match, that is, if the value of the message identifier generation counter is larger (NO in Operation S706), the message processing unit 67 of the server B60 increments the processed message management counter (Operation S707). After the message processing unit 67 generates and sets the message identifier indicating "queue name+ counter value" to the message identifier of the message received from the client terminal 10 (Operation S708). The message processing unit 67 deletes the entry corresponding to the message identifier from the reception read-ahead storage unit 52c and moves the reference pointer (Operation S709).

Here, the message processing unit 67 of the server B60 performs the read-ahead processing asynchronously with the transmission and reception of the message to replenish the entry in the reception read-ahead storage unit 52c (Operation S710).

As illustrated in FIG. 21, if the destination specified by the reception read-ahead storage unit 52c is the own server, that is, if the storage destination of the data is the own server (YES in Operation S711), the message processing unit 67 of the server B60 performs Operation S712. That is, the message processing unit 67 obtains the data to be stored in the message storage unit 52d in association with the queue A and then stores the data in the message actual data of the message received from the client terminal 10. The message processing unit 67 sets "message reception (completion)" to the communication type of the message (Operation S713) and then replies the message to the client terminal 10 (Operation S714). After Operation S714 is performed, the processing illustrated in FIG. 22 is performed in the client terminal 10.

The destination specified by the reception read-ahead storage unit 52c is not the own server (NO in Operation S711), the message processing unit 67 of the server B60 converts "queue name+counter value" into a hash value and performs Operation S715 by retrieving the server as the data storage destination according to the Chord method. That is, the message processing unit 67 sets the IP address of the retrieved server C70 to the destination information of the message received from the client terminal 10. After setting "message reception (transfer)" to the communication type of the message (Operation S716), the message processing unit 67 replies the message to the client terminal 10 (Operation S717).

As illustrated in FIG. 20, it is determined that the entry exists in the reception standby counter 52e (YES in Operation S705), the message processing unit 67 of the server B60 performs Operation S718. In the similar manner, in Operation S706, if the value of the message identifier generation counter matches the value of the processed message management counter (YES in Operation S706), the message processing unit 67 of the server B60 performs Operation S718. That is, the message processing unit 67 adds, to the reception standby counter 52e, another entry in which the queue name is associated with the identification information (IP address, process ID, and the like) of the client terminal. The message processing unit 67 sets "message reception (standby)" to the communication type of the message received from the client terminal 10 (Operation S719) and then replies the message to the client terminal 10 (Operation S720). After that, the processing illustrated in FIG. 22 is performed in the client terminal 10.

In Operation S704, if the type determining unit 65 determines that the communication type is "message reception (obtainment)," the message processing unit 67 of the server B60 performs Operation S721. That is, the message processing unit 67 obtains the data to be stored in the message storage unit 52d in associated with the queue A and then stores the data in the message actual data of the message received from the client terminal 10. The message processing unit 67 sets "message reception (obtainment completion)" for each communication type of the message (Operation S722) and then performs the processing in Operation S717 and the following operations.

In Operation S704, if the message processing unit 67 of the server B60 determines that the communication type is "message reception (confirmation)," the message processing unit 67 performs the processing illustrated in FIG. 22. In Operation S704, if the message processing unit 67 determines that the communication type is not "message reception (confirmation)," "message reception (first time)," or "message reception (obtainment)," the message processing unit 67 performs the processing illustrated in FIG. 17 or FIG. 21.

As illustrated in FIG. 21, if the entry corresponding to the queue A is stored in the reception standby counter 52e (YES in Operation S801), the message processing unit 67 of the server B60 performs Operation S802. That is, the message processing unit 67 reports the occurrence event of the unprocessed message to the client terminal of the entry to be stored in the reception standby counter 52e. After Operation S802 is performed, the processing in Operation S707 illustrated in FIG. 20 is performed.

If the entry corresponding to the queue A is not stored in the reception standby counter 52e (NO in Operation S801), the message processing unit 67 ends the processing. The message processing unit 67 performs the processing illustrated in FIG. 21 asynchronously with the processing illustrated in FIG. 20.

As illustrated in FIG. 22, the client terminal 10 determines the communication type based on the communication type of the message received from the server B60 (Operation S901 and Operation S902). If the communication type is "message reception (completion)," the client terminal 10 ends the processing.

If the communication type is "message reception (transfer)," the client terminal 10 obtains the IP address from the destination information of the received message (Operation S903), and the client terminal 10 is coupled to the server C7 corresponding to the obtained IP address (Operation S904). After setting "message reception (obtainment)" to the communication type of the received message (Operation S905), the client terminal 10 transmits the message to the server C70 to perform the communication (Operation S906). The processing in Operation S703 and the following operations illustrated in FIG. 20 are performed in the server C70.

If the communication type is "message reception (standby)," the client terminal 10 is in the reception standby state of the message of which the communication type is "message reception (completion)" or "message reception (transfer)" (Operation S907).

If the communication type is "message reception (obtainment completion)," the client terminal 10 sets "message reception (confirmation)" to the communication type of the received message (Operation S908) and then transmits the message to the server C70 to perform the communication (Operation S909). The processing in Operation S703 and the following operations illustrated in FIG. 20 are performed by the server C70.

The client terminal 10 determines that the communication type is not "message reception (transfer)," "message reception (standby)," "message reception (obtainment completion)," or "message reception (completion)," the processing illustrated in FIG. 17 or FIG. 21 is performed.

[Read-Ahead Data Updating Processing]

Figure 25:
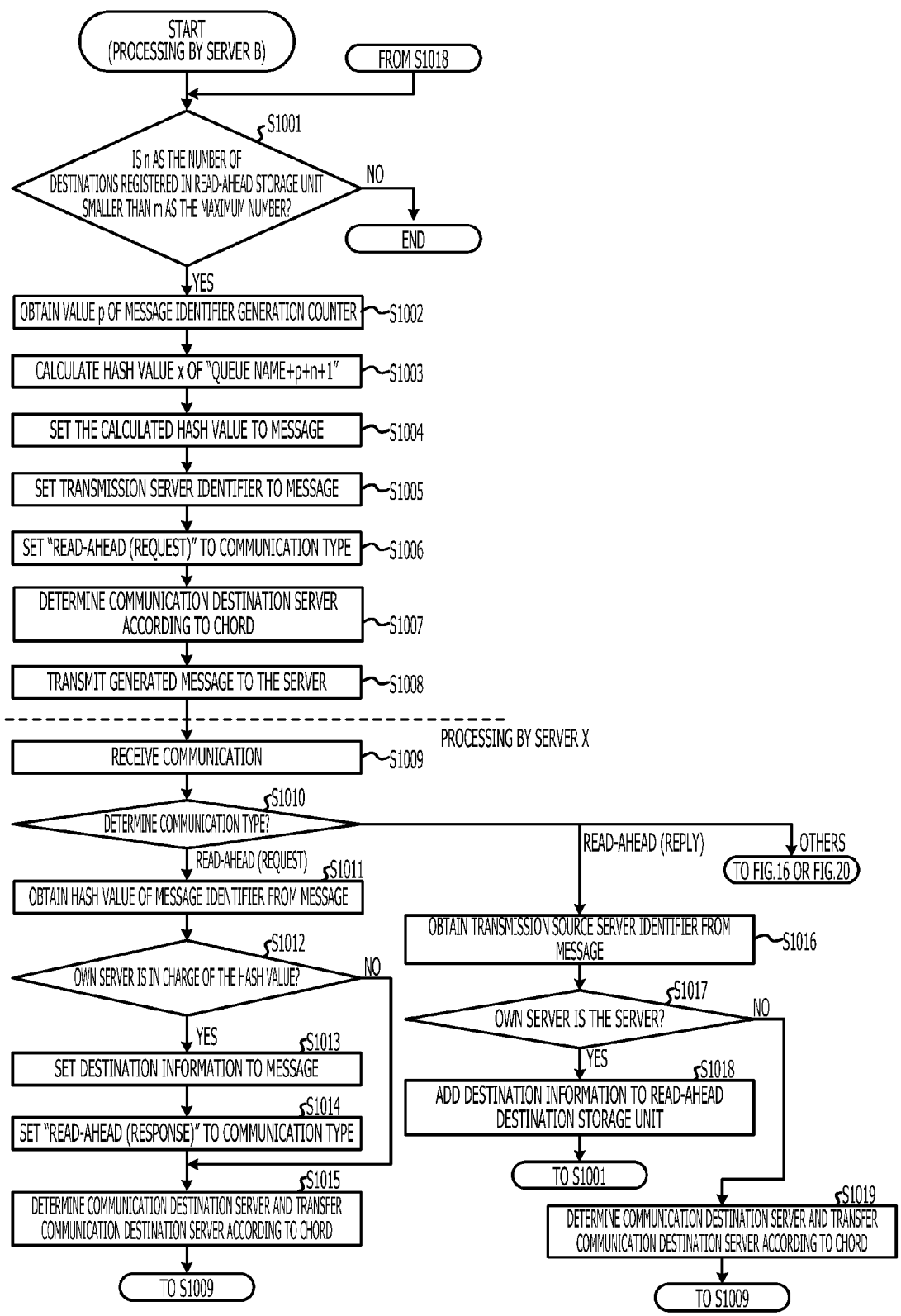
FIG. 25 is a flowchart illustrating the flow of the processing of the transmission read-ahead storage unit.

With reference to FIGS. 23 to 25, an example in which the server B60 updates the information of the queue A stored in the transmission read-ahead storage unit 62b will be described below. The servers may perform the similar processing. As for the reception read-ahead storage unit 62c, the processing may be performed in the similar manner by performing the processing for replacing the message identifier generation counter in the processing described below with the processed message management counter.

FIG. 23 is a diagram illustrating a whole flow of processing of the transmission read-ahead storage unit. FIG. 24 is a diagram illustrating message transition in the processing of the transmission read-ahead storage unit. FIG. 25 is a flowchart illustrating a flow of the processing of the transmission read-ahead storage unit processing.

As illustrated in FIG. 23, the server B60 holds "0020" as a value of the message identifier generation counter. The server B60 holds "0021, xxx.xxx.xxx.102," "0022, xxx.xxx.xxx.127," and "0023, xxx.xxx.xxx.064" as "counter value, destination information" that is stored in the transmission read-ahead storage unit 62b.

That is, the server B60 has already generated a message identifier by using the counter value "0020" for the message that requests the received data transmitting processing or the data receiving processing. As for the message that is received next from among the messages that are scheduled to be received, the server B60 specifies that the message identifier is generated by using the counter value "0021" obtained by increasing the counter value "0020" by one and the storage destination of the message is "xxx.xxx.xxx.102." In the similar manner, in the message that is received later from among the messages that are scheduled to be received, the server B60 specifies that the message identifier is generated by using the counter value "0022" obtained by increasing the counter value "0021" by one and the storage destination of the message is "xxx.xxx.xxx.127." In the similar manner, in the message that is received later from among the messages that are scheduled to be received, the server B60 specifies that the message identifier is generated by using the counter value "0023" obtained by increasing the counter value "0022" by one and the storage destination of the message is "xxx.xxx.xxx.064."

In this state, an example of read-ahead of the storage destination server corresponding to the counter value "0024" by the server B60 will be described. More specifically, the read-ahead control unit 68 of the server B60 refers to the maximum counter value that is stored in the transmission read-ahead storage unit 62b to generate a counter value by increasing the maximum counter value by one. The read-ahead control unit 68 converts "queue name (queue A)+counter value (0024)" into a hash value "aaaaaaaa" and executes the read-ahead request of the destination information in the CH space according to the Chord method.

At this time, as illustrated in FIG. 24, the read-ahead control unit 68 of the server B60 sets "read-ahead (request)" to the communication type of the above-described message and sets the hash value "aaaaaaaa" to the queue name hash value. Further, the read-ahead control unit 68 sets "server B" to the transfer source server identifier of the message and transfers the message to the next server according to the Chord method.

When receiving the above-described message, each of the servers determines whether the own server is in charge of "aaaaaaaa" that is set to the queue name hash value of the message. If each of the servers determines that the own server is not in charge, the server transfers the message to the next server. In this case, the server D is assumed to be specified to be in charge.

Based on "aaaaaaaa" that is set to the queue name hash value of the transferred message, the server D determines that the own server is in charge. Therefore, as illustrated in FIG. 24, since the transfer source server identifier of the transferred message is "server B," the server D specifies that the transfer source is the server B60. After changing the communication type of the message to "read-ahead (reply)" and setting the IP address "xxx.xxx.xxx.211" of the own server to "destination information," the server D replies the message to the server B60.

Since the communication type of the message is "read-ahead (reply)," when receiving the message, the server B60 recognizes that the message is the reply of the read-ahead request transmitted by the own server. The server B60 specifies that the queue is the queue A and the counter value is "0024" based on the queue name hash value and the like of the message and then extracts "xxx.xxx.xxx.211" from the destination information. As illustrated in FIG. 23, the server B60 stores "0024, xxx.xxx.xxx.211" as the read-ahead data of the queue A in the transmission read-ahead storage unit 62b.

With reference to FIG. 25, a flowchart of the above-described processing will be described below. As illustrated in FIG. 25, the read-ahead control unit 68 of the server B60 determines whether "n" as the number of entries is smaller than "m" as the maximum number (Operation S1001). In this case, "n" and "m" are natural numbers.

If "n" as the number of entries and "m" as the maximum number are similar to each other (NO in Operation S1001), the read-ahead control unit 68 of the server B60 ends the processing.

If "n" as the number of entries is smaller than "m" as the maximum number (YES in Operation S1001), the read-ahead control unit 68 of the server B60 obtains a value "p" of the message identifier generation counter corresponding to the queue A with reference to the queue dictionary data storage unit 52a (Operation S1002).

The read-ahead control unit 68 of the server B60 calculates the hash value of "queue name+p+n+1" (Operation S1003) and then generates a message in which the calculated hash value is set to the queue name hash value (Operation S1004). Further, the read-ahead control unit 68 sets the server B to the transfer source server identifier of the message (Operation S1005) and then sets "read-ahead (request)" to the communication type (Operation S1006). The read-ahead control unit 68 specifies the server of the transfer destination according to the Chord method (Operation S1007) and then transfers the generated message to the specified server (Operation S1008).

When receiving the message from the server B60, the type determining unit of the server determines a type based on the communication type of the received message (Operation S1009 and Operation S1010). If the type determining unit of the server determines that the communication type is "read-ahead (request)," the read-ahead control unit of the server obtains the queue name hash value of the received message (Operation S1011) and then determines whether the own server is in charge of the hash value (Operation S1012). If the read-ahead control unit of the server determines that the own server is in charge of the hash value (YES in Operation 1012), the read-ahead control unit sets the IP address of the own server to the destination information of the message (Operation S1013) and then changes the communication type to the "read-ahead (reply)" (Operation S1014). The read-ahead control unit of the server transfers the message to the next server that is specified according to the Chord method (Operation S1015). At this time, when the transmission source may be specified by the transfer source identifier of a transfer target message, the read-ahead control unit of the server may transfer the message directly to the server of the transfer source. After Operation S1015, when receiving this message, the server performs the processing in Operation S1009 and the following operations.

If the type determining unit of the server after receiving the message from the server B60 determines that the communication type is "read-ahead (reply)," the read-ahead control unit of the server obtains the transmission source information from the destination information of the message (Operation S1016). Based on the obtained transmission source information, the read-ahead control unit determines whether the own server is the transmission source (Operation S1017). If the read-ahead control unit of the server determines that the own server is the transmission source (YES in Operation S1017), the read-ahead control unit stores another entry in the transmission read-ahead storage unit 62b (Operation S1018). If the read-ahead control unit determines that the own server is not the transmission source (NO in Operation S1017), the read-ahead control unit of the server transfers the message to the next server that is specified by the Chord method (Operation S1019).

In Operation S1010, if the determining unit determines that the communication type is not "read-ahead (request)" or "read-ahead (reply)," the processing illustrated in FIG. 16, 20, and the like is performed.

As described above, the server according to the second embodiment includes a counter that generates an identifier that is unique to the message, a counter that manages the processed message, and a processing unit that reports FIFO control and the existence of the unprocessed message to a reception client. Regardless of the existence of the request from a transmission client, the server according to the second embodiment retrieves the storage destination server corresponding to the message identifier that is issued next and includes the processing unit that stores the destination information.

The server according to the second embodiment causes the message data to have the identifier indicating "queue name+counter" as a key of the data storage destination. That is, the server according to the second embodiment may previously know the storage destination of the message by using the counter of the queue dictionary. Due to this, the server according to the second embodiment previously collects the destination information of a prospective data storage server to be able to rapidly respond to data storage or a reference request from the client.

According to the Chord method or the like, a reaching speed to the server and a maintenance cost of the destination information are in a trade-off relation. More specifically, the reaching speed to the server in charge increases as each of the servers has more destination information. However, a management cost for managing the large amount of the destination information increases. On the other hand, as each of the servers holds less destination information, the reaching speed to the server in charge decreases. However, the small amount of the destination information is managed, so that the management cost may be reduced.

On the contrary, the server according to the second embodiment, the read-ahead processing is performed to previously store the server that is in charge of the message to be received in the future. The server according to the second embodiment may perform the read-ahead processing in consideration of the memory capacity and the cost, so that the management cost may be reduced. As a result, in the system according to the second embodiment, even if the size of a distribution system increases, that is, even if the number of servers increases, the transmission and reception of the message may be performed where a replying speed does not change dynamically.

The message queue formed in the server according to the second embodiment takes over characteristics such as expandability and fault tolerance of the DHT. Due to this, a user may expand the capacity of the message queue without a complicated setting. Similarly, the message queue takes over the characteristic of distribution of the DHT, so that messages are distributed and stored in servers in the system. Thus, the I/O load may be distributed.

Although the embodiments of the present application have been described above, the present application is applicable to other embodiments. Another embodiment will be described below.

Figure 26:
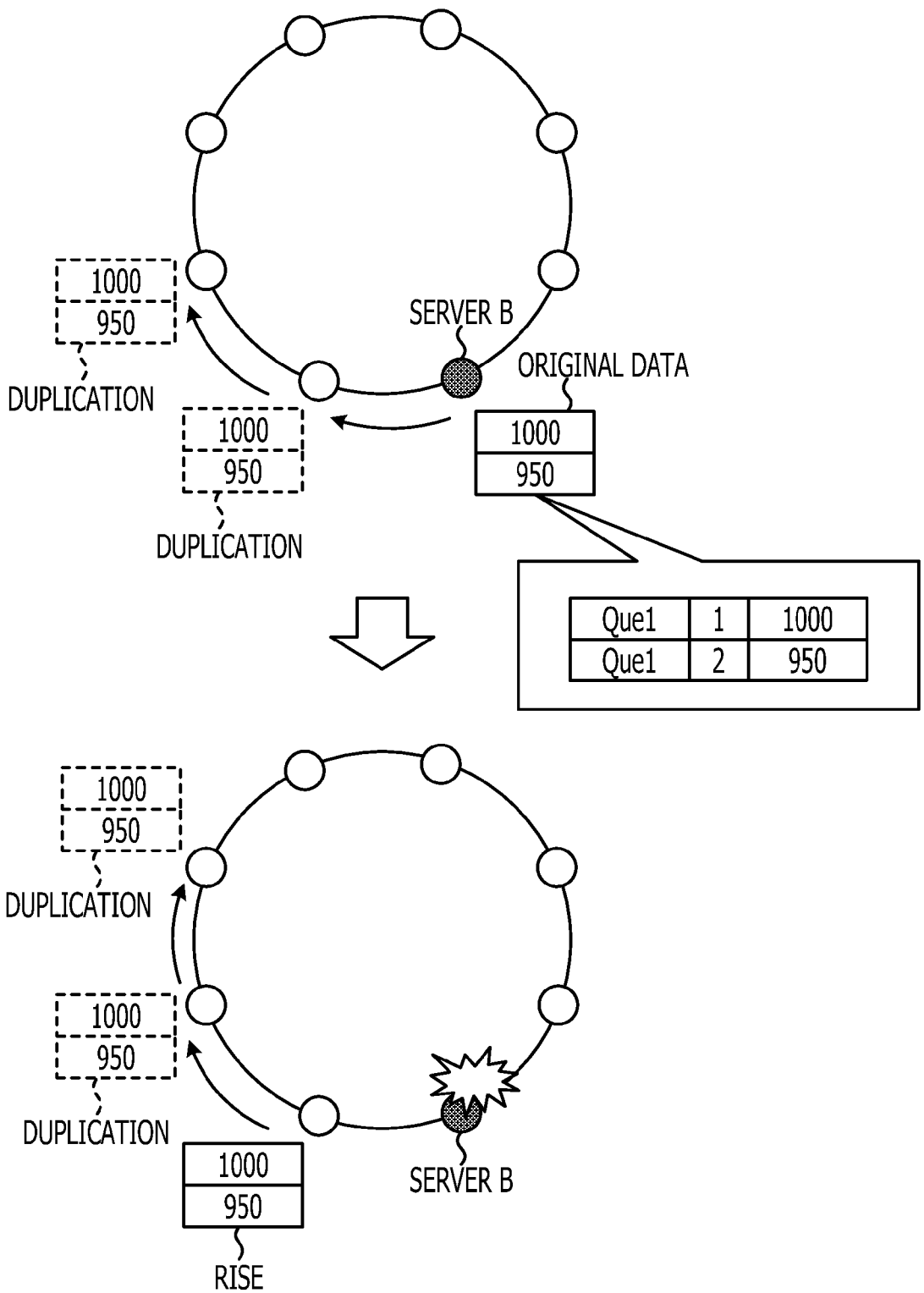
FIG. 26 is a diagram illustrating a behavior of queue dictionary data in a case where a server B moves out of a CH space.

FIG. 26 is a diagram illustrating a behavior of the dictionary data when the server B moves out of the CH space. As illustrated in FIG. 26, the server B stores "Que1, 1, 1000" and "Que1, 2, 950" as "queue name, attribute, counter value" in the queue dictionary data storage unit 52a. That is, the server B holds the queue dictionary data in a queue value structure with the queue name as a key, so that the queue dictionary data may be redundant by a general data duplication logic of the CH space. The number of queue dictionary data of another server held by one server, that is, the number of duplication may be redundant by the general data duplication logic of the CH space.

For example, each of the servers in the CH space holds the queue dictionary data of the server positioned before and behind the own server. When the server B moves out of the CH space, a server F positioned behind the server B detects that the server B moves out of the CH space and rises the held queue dictionary data of the server B to an active system. The client terminal 10 is newly coupled to the server of which the queue dictionary is active. This is performed according to a general method for retrieving a "subsequent" server after the server moves out of the CH space. When retrieving the subsequent server, the client terminal 10 establishes a connection with the subsequent server.

FIG. 27 is a diagram illustrating a behavior of the queue dictionary data where a server X comes into the CH space. When another server is added in the CH space, the processing may be performed according to the general duplication logic of the CH space as illustrated in FIG. 26.

For example, the server B is in charge of the range from hash value=33 to hash value=4 to hold the queue dictionary data of Que1 and Que2. For example, the server B holds "Que1, 1, 100" and "Que1, 2, 950" as the data of Que1 with hash value=2. The server B further holds "Que2, 1, 20" and "Que2, 2, 20" as the data of Que2 with hash value=4.

In this state, the server X that is in charge of hash value=2 is assumed to be added in the CH space. In this case, the server B transmits the data "Que1, 1, 1000" and "Que1, 2, 950 of the held hash value=2 to the server X. In this manner, the server X and the server B may hold the queue dictionary data of the queue of the own server in charge.

For example, according to the Chord method, some of the servers are able to subjected to life-and-death monitoring by the own server. To prevent the traffic from increasing, the disclosed server may be controlled not to work within the range in which no configuration change is detected according to the monitoring range of a routing algorithm to be used. For example, when the server configuration outside the monitor area varies, there is a possibility that the coupled server has no data or that there is no server. In this case, the disclosed server may perform retrieval or the like based on the message identifier from the coupled server or the server having the queue directory. When detecting a variation of the server configuration, the disclosed server corrects each of the read-ahead storage units. For example, the disclosed server may scan the entry of each read-ahead storage unit, correct affected parts, and reconstruct all the entries. This is performed asynchronously with the transmission and reception request of the message.

The format example of the message illustrating in FIG. 2 is an example. The present application is not limited to the example. The information such as IP address, host name, and queue name that are used to illustrate the embodiments are examples, and the numerals and the like have no meaning. The present application is not limited to the examples. The second embodiment describes the example in which the client terminal 10 requests the server A50 to open the queue A and the example in which the data is stored in the server 70C through the server B60. However, the examples do not limit the processing and the like.

In the second embodiment, a case of using the counter that increases by one in the reception order as the message identifier is described. However, the present application is not limited to the case. For example, the counter that decreases by one in the reception order may be used, and the counter value with a fixed regularity of a counter such as "letter+simple increase counter".

For example, if there is a margin of bandwidth of the network in the system, the reception read-ahead storage unit and the transmission read-ahead storage unit are combined to be a single read-ahead storage unit to be shared. If there is no margin of bandwidth of the network, the traffic may be reduced by maintaining the reception read-ahead storage unit and the transmission read-ahead storage unit separately from each other. The read-ahead control processing may be performed asynchronously with the data transmitting processing and the data receiving processing. The read-ahead control processing may be performed synchronously with the data transmitting processing and the data receiving processing, for example, when the data is transmitted.

According to the embodiments, each of the storage units included in the memory unit 52 describes an example of storage of the data in a KVS format. However, the present application is not limited to the example. For example, an arbitrary data structure such as a relation database may be used.

Among the processing described in the present embodiments, all or some of the processing that are automatically performed as described may be manually performed. Alternatively, all or some of the processing that are manually performed may be automatically performed by a known method. As for the information that includes the processing procedure, control procedure, specific names, various data and parameters described above and illustrated in the diagrams may be changed arbitrarily not otherwise specified.

The components of each of the apparatuses illustrated are function conceptual, and the components are not generally desired to be configured as illustrated in the diagrams. That is, the specific mode of distribution and combination of the apparatuses is not limited to the illustration. That is, all or some of the apparatuses may be distributed/combined functionally or physically by arbitrary unit according to various loads or usage states. For example, the open processing unit 56 may be combined with the message processing unit 57.

All or some of the processing functions that are performed in the devices are achieved by the program executed by the CPU (central processing unit) and the program that is analyzed and executed by the CPU or achieved as hardware by a wired logic. The processor such as a CPU is not similar to the processing unit illustrated in FIG. 4 and the like. The processor may perform the processing units and the processing similar to the flow illustrated in FIG. 4 and the like.

The various processing according to the above-described embodiments may be achieved by executing a program that is previously prepared in a computer system such as a personal computer and a work station. An example of the computer system that executes the program with the function equivalent to the above-described embodiments.

Figure 28:
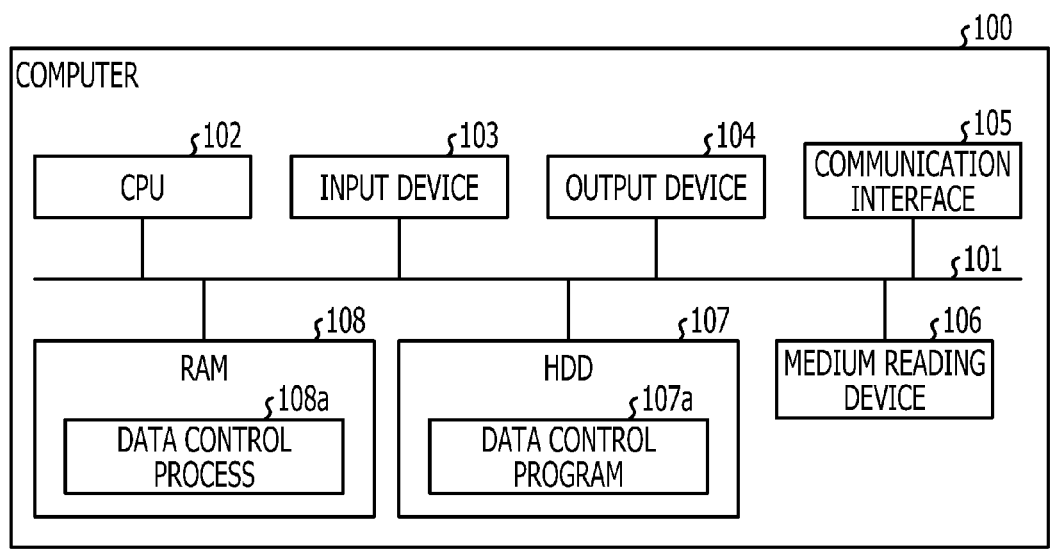
FIG. 28 is a diagram illustrating an example of a hardware configuration of a computer that executes a data control program.

FIG. 28 is a diagram illustrating an example of a hardware configuration of a computer that executes a data control program. As illustrated in FIG. 28, a computer 100 includes a CPU 102, an input device 103, an output device 104, a communication interface 105, a medium reading device 106, a Hard Disk Drive (HDD) 107, and a RAM 108. The respective units illustrated in FIG. 28 are coupled to each other by a bus 101.

The input device 103 is, for example, a mouse or a keyboard. The output device 104 is, for example, a display. The communication interface 105 is, for example, an interface such as a Network Interface Card (NIC). The HDD 107 stores the information illustrated in FIG. 4 as well as a data control program 107a. Although the HDD 107 is given as an example of recording medium, the various programs may be stored in a computer readable recording medium such as RAM and CD-ROM and read by a computer. The recording medium is allocated in a remote place, and the computer may obtain and use the program by accessing the recording medium. At this time, the obtained program may be stored in the recording medium of the computer.

By reading out and extracting the data control program 107a in the RAM 108, the CPU 102 causes a data control process 108a to operate to perform the functions illustrated in FIG. 4 and the like. That is, the data control process 108a performs the cluster control unit 54, the type determining unit 55, the open processing unit 56, and the message processing unit 57 illustrated in FIG. 4. In this manner, by reading out and executing the program, the computer 100 operates as an information processing apparatus that executes the data control method.

For example, the computer 100 reads out the data control program from the recording medium by the medium reading device 106 and achieves the functions equivalent to the above-described embodiments by executing the read data control program. The program according to other embodiments is not limited to the performance of the computer 100. For example, even when another computer or server executes the program or when the computer and the server cooperate to execute the program, the present application is applicable.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and configured to:
determine an identifier that is scheduled to be added to an access request that is to be received from a client apparatus next, based on a receiving order of the access request, the identifier being a counter value indicating the receiving order of the access request,
specify an information processing apparatus that processes the access request to which the determined identifier is to be added from among a plurality of information processing apparatuses in a distribution-type network,
store, in the memory, information specifying the specified information processing apparatus and the identifier that is scheduled to be added, which are associated with each other,
add the determined identifier to the received access request when the processor receives the access request from the client apparatus,
extract information specifying the information processing apparatus corresponding to the determined identifier from the memory, and
transmit the information specifying the information processing apparatus to the client apparatus.

2. The information processing apparatus according to claim 1,
wherein the processor is configured to:
specify the information processing apparatus by calculating a hash value by using the determined identifier, and
determine the information processing apparatus corresponding to the calculated hash value as a storage destination of data in association with the determined identifier by using a distributed hash table.

3. The information processing apparatus according to claim 1, wherein the processor is configured to:
store an internet protocol (IP) address of the specified information processing apparatus and the identifier that is scheduled to be added, which are associated with each other.

4. The information processing apparatus according to claim 1, wherein the processor is configured to:
delete the information stored in the memory when the information specifying the information processing apparatus is extracted from the memory, and
specify an information processing apparatus that processes a next access request to be received from the client apparatus next.

5. The information processing apparatus according to claim 1, wherein the memory is configured to store a first identifier which is added to a latest access request whose corresponding processing has executed,
wherein the processor is configured to:
compare a second identifier with the first identifier that is stored in the memory when the second identifier is added to an access request, and
when the processor determines that there is an unprocessed access request by comparing the second identifier with the first identifier, executing the processing corresponding to the unprocessed access request in advance of the received access request.

6. The information processing apparatus according to claim 1, wherein the processor is configured to:
receive a queue name of a message queue from the client apparatus, the queue name being included in an open request and specified by the client apparatus, and
convert the queue name into a hash value and then specifying whether the information processing apparatus is in charge, and when the hash value indicates that the information processing apparatus is not in charge, add an IP (internet protocol) address of the information processing apparatus to the received access request and then transfer the access request to the distribution-type network.

7. The information processing apparatus according to claim 6, wherein the processor is further configured to:
when the hash value indicates that the information processing apparatus is in charge, transmit the information of the specified information processing apparatus as a storage destination of a block of data to the client apparatus.

8. The information processing apparatus according to claim 7, wherein the processor is configured to:
receive an IP address of the specified information processing apparatus from the specified information processing apparatus.

9. A data control method, comprising:
determining an identifier that is scheduled to be added to an access request that is to be received from a client apparatus next, based on a receiving order of the access request, the identifier being a counter value indicating the receiving order of the access request;
specifying an information processing apparatus that processes the access request to which the determined identifier is to be added from among a plurality of information processing apparatuses in a distribution-type network;
storing, in a memory, information specifying the specified information processing apparatus and the identifier that is scheduled to be added, which are associated with each other;
adding the determined identifier to the received access request when the processor receives the access request from the client apparatus;
extracting information specifying the information processing apparatus corresponding to the determined identifier from the memory; and
transmitting the information specifying the information processing apparatus to the client apparatus.

10. A non-transitory computer-readable recording medium storing a program that causes a processor to execute a process including:
determining an identifier that is scheduled to be added to an access request that is to be received from a client apparatus next, based on a receiving order of the access request, the identifier being a counter value indicating the receiving order of the access request;
specifying an information processing apparatus that processes the access request to which the determined identifier is to be added from among a plurality of information processing apparatuses in a distribution-type network;
storing, in a memory, information specifying the specified information processing apparatus and the identifier that is scheduled to be added, which are associated with each other;
adding the determined identifier to the received access request when the processor receives the access request from the client apparatus;
extracting information specifying the information processing apparatus corresponding to the determined identifier from the memory; and
transmitting the information specifying the information processing apparatus to the client apparatus.

11. The information processing apparatus according to claim 6, wherein
a header of the access request includes a communication type information indicating a message type of the access request, and
the processor is configured to:
receive, from the client apparatus, the access request including information indicating a first-time message as the communication type information, and
change the communication type information of the access request to information indicating a transferred message, when the processor transfers the access request to the distribution-type network.

* * * * *